US008139260B2

(12) United States Patent
Lapstun et al.

(10) Patent No.: US 8,139,260 B2
(45) Date of Patent: *Mar. 20, 2012

(54) HANDHELD DISPLAY DEVICE FOR ASSOCIATING MULTIMEDIA OBJECTS WITH PRINTED SUBSTRATES

(75) Inventors: Paul Lapstun, Balmain (AU); Kia Silverbrook, Balmain (AU); Tobin Allen King, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,463

(22) Filed: Mar. 30, 2010

(65) Prior Publication Data

US 2010/0184463 A1 Jul. 22, 2010

Related U.S. Application Data

(63) Continuation of application No. 12/341,861, filed on Dec. 22, 2008, which is a continuation of application No. 10/917,436, filed on Aug. 13, 2004, now Pat. No. 7,609,410, which is a continuation of application No. 09/722,147, filed on Nov. 25, 2000, now Pat. No. 6,946,672.

(30) Foreign Application Priority Data

Dec. 1, 1999 (AU) ....................................... PQ4392

(51) Int. Cl.
*G06F 15/00* (2006.01)
*G06K 1/00* (2006.01)
(52) U.S. Cl. ..................................... 358/1.18; 358/1.15

(58) Field of Classification Search .................. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 4,864,618 A | 9/1989 | Wright et al. |
| 4,888,479 A | 12/1989 | Tamaru |
| 5,051,736 A | 9/1991 | Bennett et al. |
| 5,465,080 A | 11/1995 | Liddiard et al. |

(Continued)

FOREIGN PATENT DOCUMENTS

GB 2306669 A 5/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner* — Thierry Pham

(57) ABSTRACT

A handheld display device for associating a multimedia object with a zone of a printed substrate. The device comprises: a memory storing multimedia objects; an optical sensor for imaging an area of the printed substrate and for generating image data; a processor for determining interaction data using the image data, the interaction data identifying a substrate identity; a transceiver for retrieval of display data corresponding to the printed substrate; and a touch-sensitive screen for displaying display information based on the display data. The device is configured such that a predetermined user interaction with the display information indicates an association of one of the multimedia objects with the zone of the printed substrate. Subsequent interaction with the zone of the printed causes retrieval of the multimedia object.

16 Claims, 24 Drawing Sheets

U.S. PATENT DOCUMENTS

| | | | |
|---|---|---|---|
| 5,477,012 A | 12/1995 | Sekendur | |
| 5,652,412 A | 7/1997 | Lazzouni et al. | |
| 5,661,506 A | 8/1997 | Lazzouni et al. | |
| 5,692,073 A | 11/1997 | Cass | |
| 5,835,577 A | 11/1998 | Disanto et al. | |
| 5,852,286 A | 12/1998 | Coleman | |
| 5,852,434 A | 12/1998 | Sekendur | |
| 5,900,110 A | 5/1999 | Goodwin et al. | |
| 5,974,334 A * | 10/1999 | Jones, Jr. | 455/556.2 |
| 5,982,352 A | 11/1999 | Pryor | |
| 5,995,105 A | 11/1999 | Reber et al. | |
| 6,076,734 A | 6/2000 | Dougherty et al. | |
| 6,138,915 A | 10/2000 | Danielson | |
| 6,152,369 A | 11/2000 | Wilz | |
| 6,211,856 B1 | 4/2001 | Choi et al. | |
| 6,330,976 B1 * | 12/2001 | Dymetman et al. | 235/487 |
| 6,332,084 B1 * | 12/2001 | Shaanan et al. | 455/566 |
| 6,433,801 B1 * | 8/2002 | Moon et al. | 715/840 |
| 6,512,919 B2 | 1/2003 | Ogasawara | |
| 6,622,917 B1 * | 9/2003 | Knowles | 235/462.01 |
| 6,964,374 B1 | 11/2005 | Djuknic et al. | |
| 7,609,410 B2 | 10/2009 | Lapstun et al. | |
| 7,777,911 B2 | 8/2010 | Silverbrook | |
| 2001/0040584 A1 * | 11/2001 | Deleeuw | 345/629 |

FOREIGN PATENT DOCUMENTS

| | | |
|---|---|---|
| WO | WO 99/18487 A2 | 4/1999 |
| WO | WO 99/50787 | 10/1999 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

HANDHELD DISPLAY DEVICE FOR ASSOCIATING MULTIMEDIA OBJECTS WITH PRINTED SUBSTRATES

CROSS REFERENCES TO RELATED APPLICATIONS

This application is a Continuation of U.S. application Ser. No. 12/341,861 filed Dec. 22, 2008, which is a Continuation of U.S. application Ser. No. 10/917,436 filed Aug. 13, 2004, now issued U.S. Pat. No. 7,609,410, which is a Continuation of U.S. application Ser. No. 09/722,147 filed Nov. 25, 2000, now issued as U.S. Pat. No. 6,946,672.

FIELD OF INVENTION

The present invention relates generally to devices for interacting with computer systems, and in particular, to a device which may be used to render otherwise passive surfaces audiovisually interactive via invisible surface codings.

CO-PENDING APPLICATIONS

Various methods, systems and apparatus relating to the present invention are disclosed in the following co-pending applications/granted patents filed by the applicant or assignee of the present invention simultaneously with the present invention.

| | | | | | |
|---|---|---|---|---|---|
| 6,530,339 | 6,631,897 | 7,295,839 | 7,593,899 | 7,175,079 | 7,064,851 |
| 6,826,547 | 6,741,871 | 6,927,871 | 6,980,306 | 6,965,439 | 6,788,982 |
| 7,263,270 | 6,788,293 | 6,946,672 | 7,091,960 | 6,792,165 | 7,105,753 |
| 7,182,247 | | | | | |

The disclosures of these co-pending applications are incorporated herein by cross-reference.

Various methods, systems and apparatus relating to the present invention are disclosed in the following co-pending applications/granted patents filed by the applicant or assignee of the present invention on Oct. 20, 2000:

| | | | | | |
|---|---|---|---|---|---|
| 7,190,474 | 7,110,126 | 6,813,558 | 6,965,454 | 6,847,883 | 7,131,058 |
| 7,533,031 | 6,982,798 | 6,474,888 | 6,627,870 | 6,724,374 | 7,369,265 |
| 6,454,482 | 6,808,330 | 6,527,365 | 6,474,773 | 6,550,997 | |

The disclosures of these co-pending applications are incorporated herein by reference.

Various methods, systems and apparatus relating to the present invention are disclosed in the following co-pending applications/granted patents filed by the applicant or assignee of the present invention on Sep. 15, 2000:

| | | | |
|---|---|---|---|
| 6,679,420 | 6,963,845 | 6,995,859 | 6,720,985 |

The disclosures of these co-pending applications are incorporated herein by reference.

Various methods, systems and apparatus relating to the present invention are disclosed in the following co-pending applications/granted patents filed by the applicant or assignee of the present invention on Jun. 30, 2000:

| | | | | | |
|---|---|---|---|---|---|
| 6,824,044 | 6,678,499 | 6,976,220 | 6,976,035 | 6,766,942 | 7,286,113 |
| 6,922,779 | 6,978,019 | 7,406,445 | 6,959,298 | 6,973,450 | 7,150,404 |
| 6,965,882 | 7,233,924 | 7,007,851 | 6,957,921 | 6,457,883 | 6,831,682 |
| 6,977,751 | 6,398,332 | 6,394,573 | 6,622,923 | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | |
|---|---|---|---|---|
| 6,428,133 | 6,526,658 | 6,315,399 | 6,338,548 | 6,540,319 |
| 6,328,431 | 6,328,425 | 6,991,320 | 6,383,833 | 6,464,332 |
| 6,390,591 | 7,018,016 | 6,328,417 | 09/575,197 | 7,079,712 |
| 09/575,123 | 6,825,945 | 7,330,974 | 6,813,039 | 6,987,506 |
| 7,038,797 | 6,980,318 | 6,816,274 | 7,102,772 | 7,350,236 |
| 6,681,045 | 6,728,000 | 7,173,722 | 7,088,459 | 09/575,181 |
| 7,068,382 | 7,062,651 | 6,789,194 | 6,789,191 | 6,644,642 |
| 6,502,614 | 6,622,999 | 6,669,385 | 6,549,935 | 6,987,573 |
| 6,727,996 | 6,591,884 | 6,439,706 | 6,760,119 | 7,295,332 |
| 6,290,349 | 6,428,155 | 6,785,016 | 6,870,966 | 6,822,639 |
| 6,737,591 | 7,055,739 | 7,233,320 | 6,830,196 | 6,832,717 |
| 6,957,768 | 09/575,162 | 7,456,820 | 7,170,499 | 7,106,888 |
| 7,123,239 | 6,409,323 | 6,281,912 | 6,604,810 | 6,318,920 |
| 6,488,422 | 6,795,215 | 7,154,638 | 6,859,289 | |

The disclosures of these co-pending applications are incorporated herein by cross-reference.

BACKGROUND

Devices such as personal computers, personal digital assistants and even mobile phones may be used to interact with audiovisual information and with computer applications which have an audiovisual interface.

In general, these devices don't provide access to situated interactive information or application interfaces, e.g. to an online fan club chat group associated with a concert poster encountered at a train station, or a mortgage calculator associated with a flyer received through the mail. Each device must be used to seek out the desired information or application interface through a virtual space accessible through the device, or the information or application must be brought to the device in a device-compatible physical format.

The present invention utilizes methods, systems and devices related to a system referred to as "netpage", described in our co-pending applications listed above, wherein invisible coded data is disposed on various surfaces to render the surfaces interactive in the manner of graphical user interfaces to computer systems.

SUMMARY OF INVENTION

In one broad form the invention provides a viewer with one or more sensors capable of sensing coded data. Images which include coded data are sensed by the viewer and decoded. The decoded information is transmitted to a computer system which associates the decoded data with one or more files stored on the system, using previously stored association data. The file or files are transmitted to the viewer and to the user via the viewer's display screen. The device includes a printing mechanism which allows markings to be made on a substrate. The markings may be based partially or wholly on user input or on data transmitted from the computer system to the viewer.

Accordingly, in one broad form, the invention provides a viewer including:

at least one sensor for sensing coded data on or in a substrate and for generating first data;

a transceiver for transmitting said first data or second data at least partially based on the first data to a computer system and for receiving at least display data associated with an identity derived from the first data from the computer system;

at least one display device for outputting visual information based at least partially on said display data, and a printer mechanism for printing on the substrate.

Printer mechanisms other than conventional ink deposition type print mechanisms may be used. Examples of other types of print mechanisms include the use of thermal paper, such as used in facsimile machines. In addition the substrate may be imprinted with electronically active inks and the print mechanism may be a device for selectively changing the state of the electronically active inks For a better understanding of electronically active inks, reference is made to U.S. Pat. Nos. 6,017,584, 6,124,851, 6,120,839, 6,120,588, 6,11,8426 and 6,067,185, all assigned to E Ink Corporation, the contents of each of which are included herein by reference.

In one form the visual output corresponds to a human discernable interface on the substrate, such as text.

In use the viewer may be moved across a substrate tiled with data encoded tags and the output is modified as the viewer is moved across the substrate so as to correspond to the interface on the substrate.

The optical output may correspond to the interface but be text in the same or a different language as the interface. The optical output may include the same, more or less information as the interface on the substrate. The interface may represent information, such as bank account information which is not displayed on the interface in full but is displayed in full via the viewer.

The device preferably has controls to enable the optical output to display information with a size the same, less or more than the corresponding information on the interface.

The device preferably includes a touch screen and the optical output includes interactive elements by which the user may modify the optical output by interaction with the touch screen.

The touch screen may be used to input writing or other markings from the user. The viewer may then print markings on the substrate based on the user input markings. The markings printed may be substantially identical to the user input markings or may be printed text corresponding to user input handwriting after the user input has undergone text recognition processes.

The device may also display motion pictures, in which case the physical relationship between the viewer and the substrate once the coded data has been transmitted may be immaterial.

The viewer may also include memory into which a file or files are downloaded for subsequent viewing.

When the viewer is lifted from the page the portion of the page with which the viewer was last in contact can be retained by the viewer and remain interactive. The viewer can do this by default, or alternatively only when the user 'freezes' or 'snaps' the current view before lifting the viewer from the page, as discussed in more detail below. The viewer may include controls for rotating and panning the view after the viewer has been lifted from the page, allowing the viewer to be used to navigate an entire page after only a single contact with it. The navigation controls may be in the form of a small joystick, or a pair of orthogonal thumb wheels, or may be provided via the touch-screen.

The viewer senses the identity of the underlying page as well as its own position and orientation relative to the page using a netpage sensor embedded in the viewer. The viewer can contain multiple sensors (one in each corner, for example), so that it works when only partially overlapping a page or even when overlapping multiple pages. A single sensor located in the center of the viewer is sufficient for most purposes, however, and is most economical.

The viewer is capable of providing an enhanced view of the underlying page. In the dark, for example, it can provide a lit view of the page. When magnification is needed, it can provide a zoomed view of the page via its zoom controls. The viewer may also be able to provide a zoomed-out view of the page.

The viewer can provide an alternative (or additional) netpage data entry mechanism, i.e. the usual kinds of inputs, including drawing and handwriting and gestures, can be captured relative to the displayed page via the touch-screen instead of relative to the physical page via the netpage pen.

The viewer can provide access to dynamic content, such as audio and video, in the context of a physical page. Playback controls which provide access to interactive content are typically only shown when the page is viewed through the viewer. They may be shown on the printed page as well, although ideally in a form which clearly indicates that they are inactive. Status information such as playing time may also be shown on-screen. The underlying page layout should provide space for the display of interactive controls and status information, so that the printed page and on-screen display remain compatible. Interactive control is not limited to playback of streaming media such as audio and video. It can include arbitrary interaction with a computer application. It may, for example, include manipulation of an object in 3D.

DETAILED DESCRIPTION OF PREFERRED AND OTHER EMBODIMENTS

Figure 1:
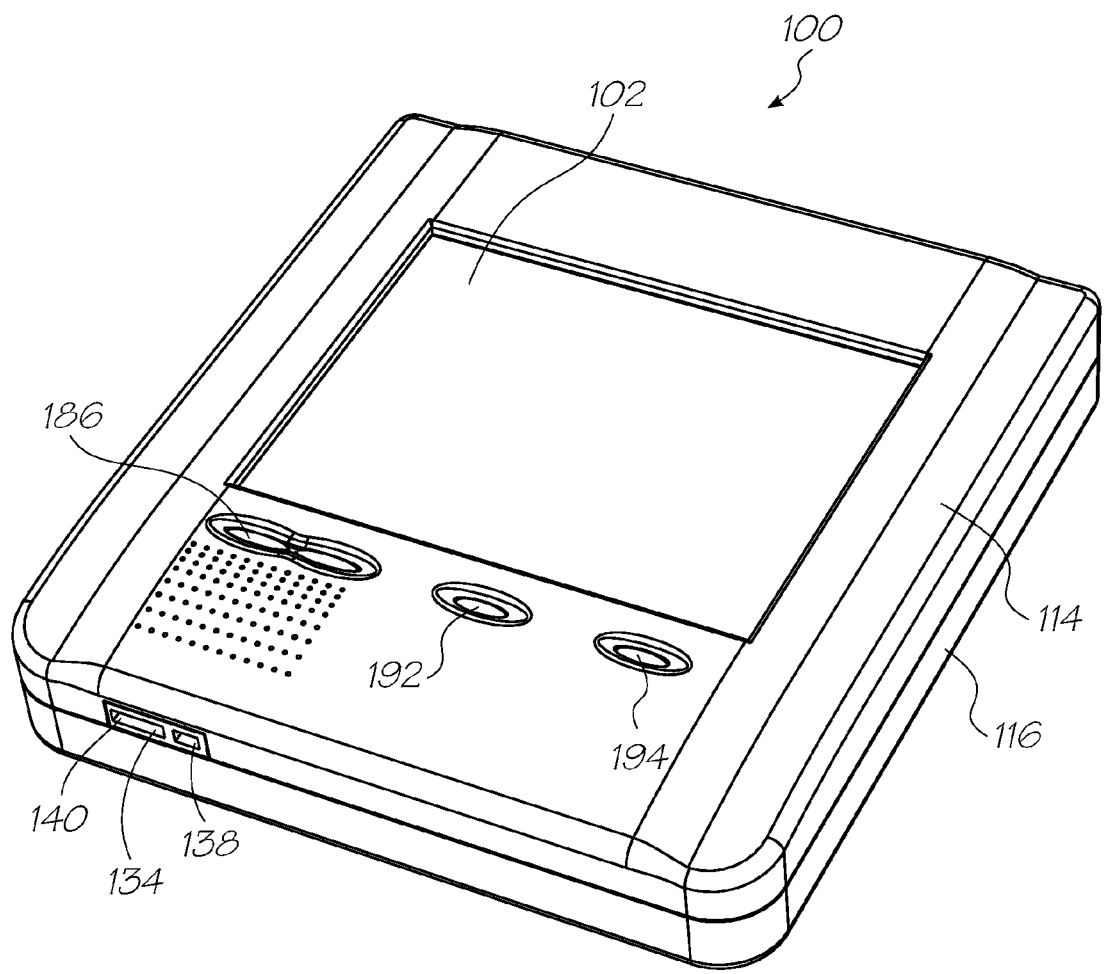
FIG. 1 is a perspective view from above of an embodiment of the invention.
Figure 2:
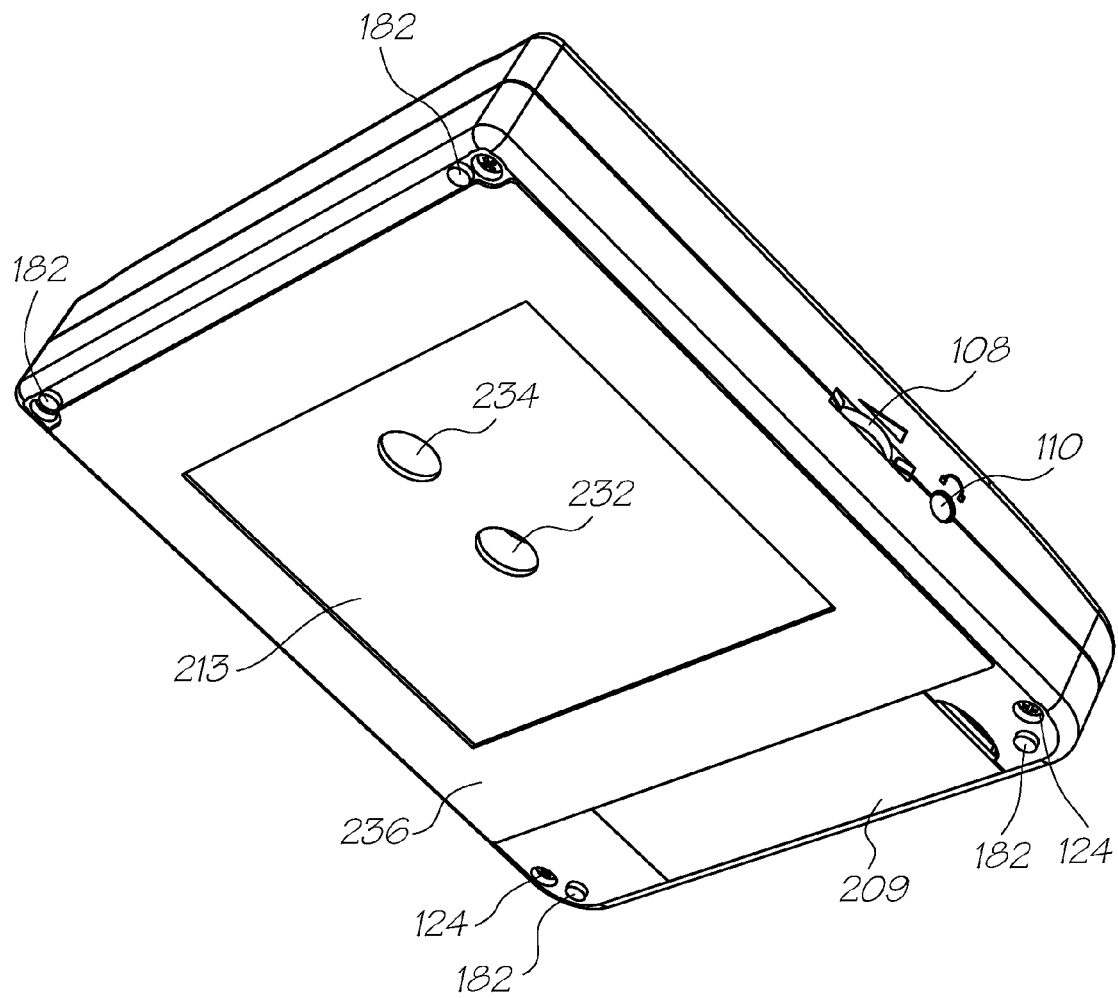
FIG. 2 is a perspective view from below of the FIG. 1 device.
Figure 3:
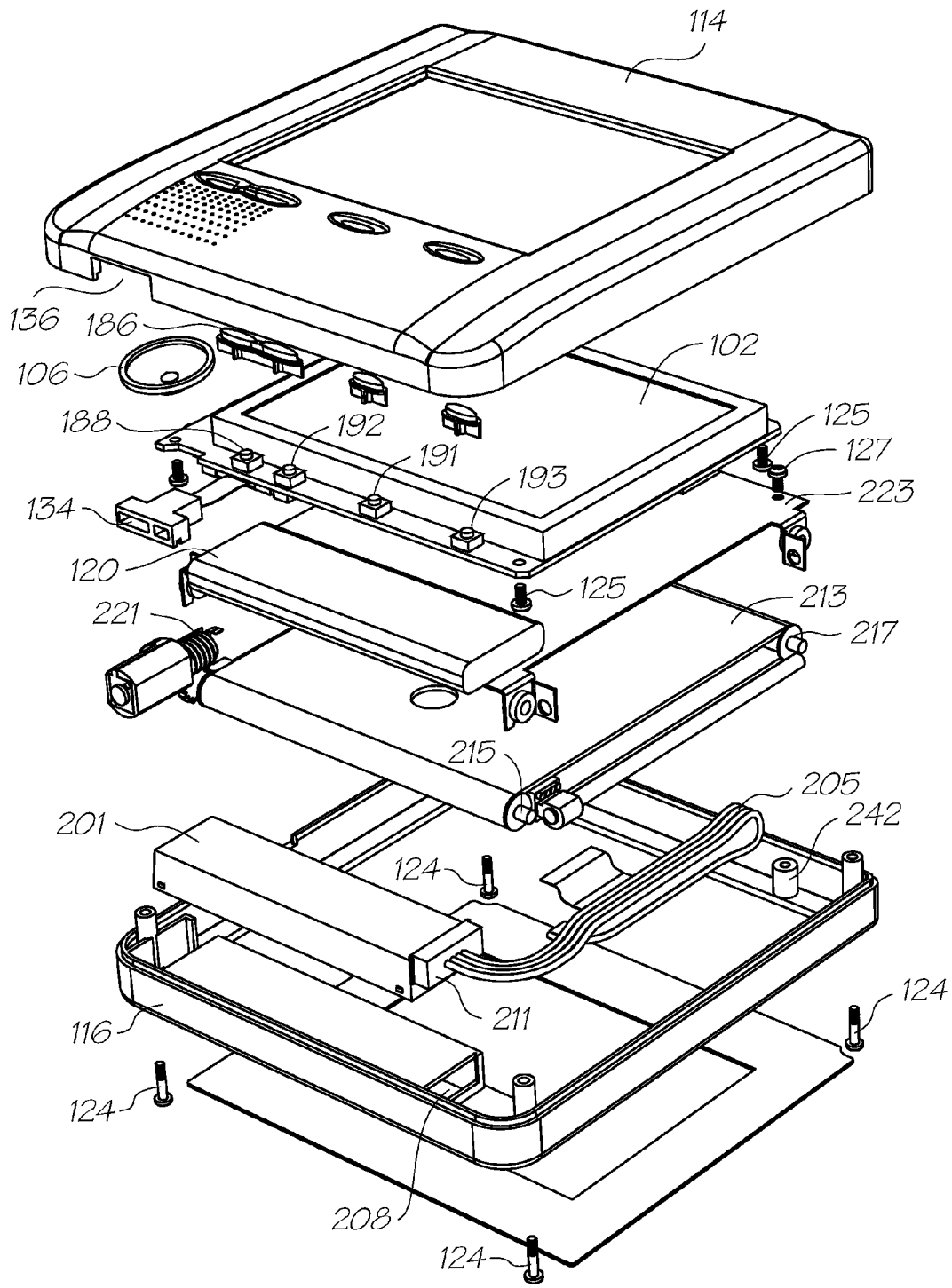
FIG. 3 is an exploded perspective view from above of the FIG. 1 device.
Figure 4:
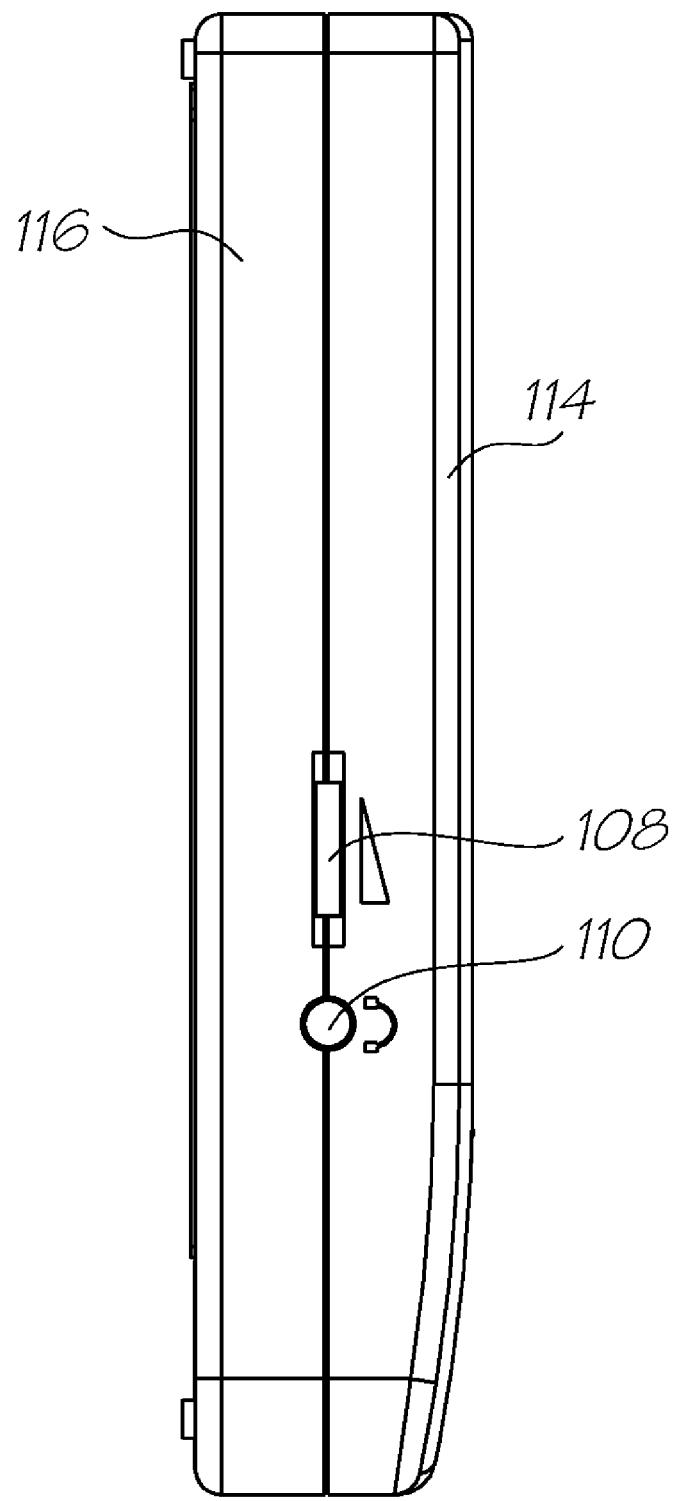
FIG. 4 is a side view from the rear of the device of FIG. 1.
Figure 5:
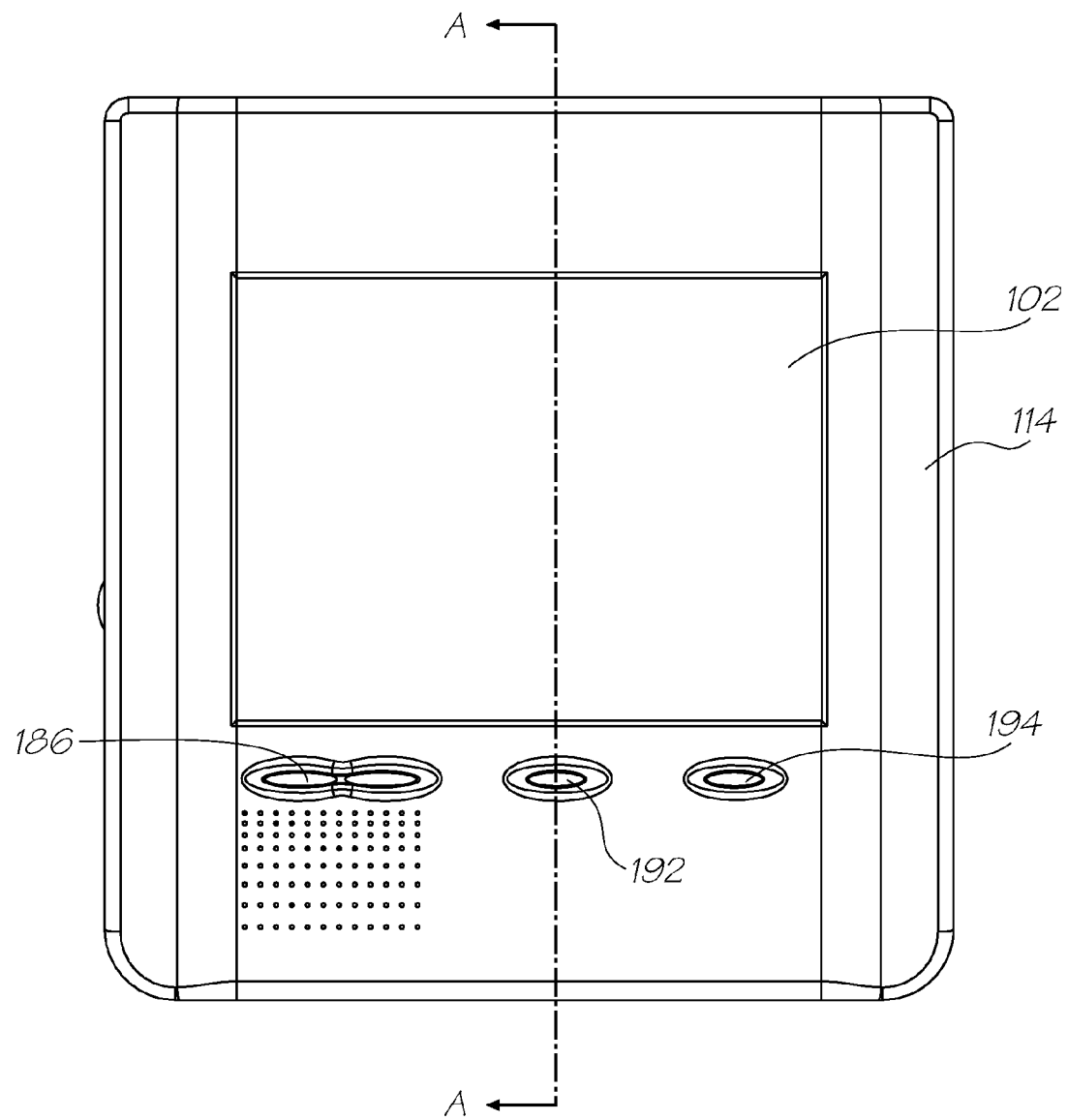
FIG. 5 is a plan view from above of the FIG. 1 device.
Figure 6:
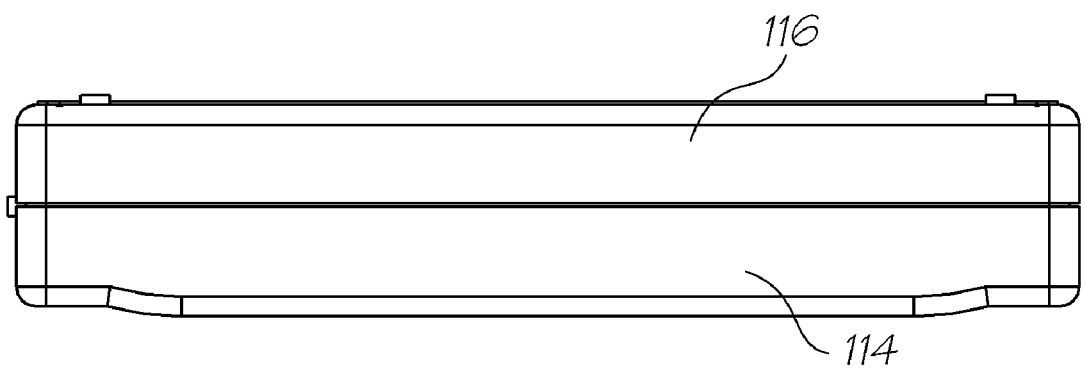
FIG. 6 is a side view from the right of the FIG. 1 device.
Figure 7:
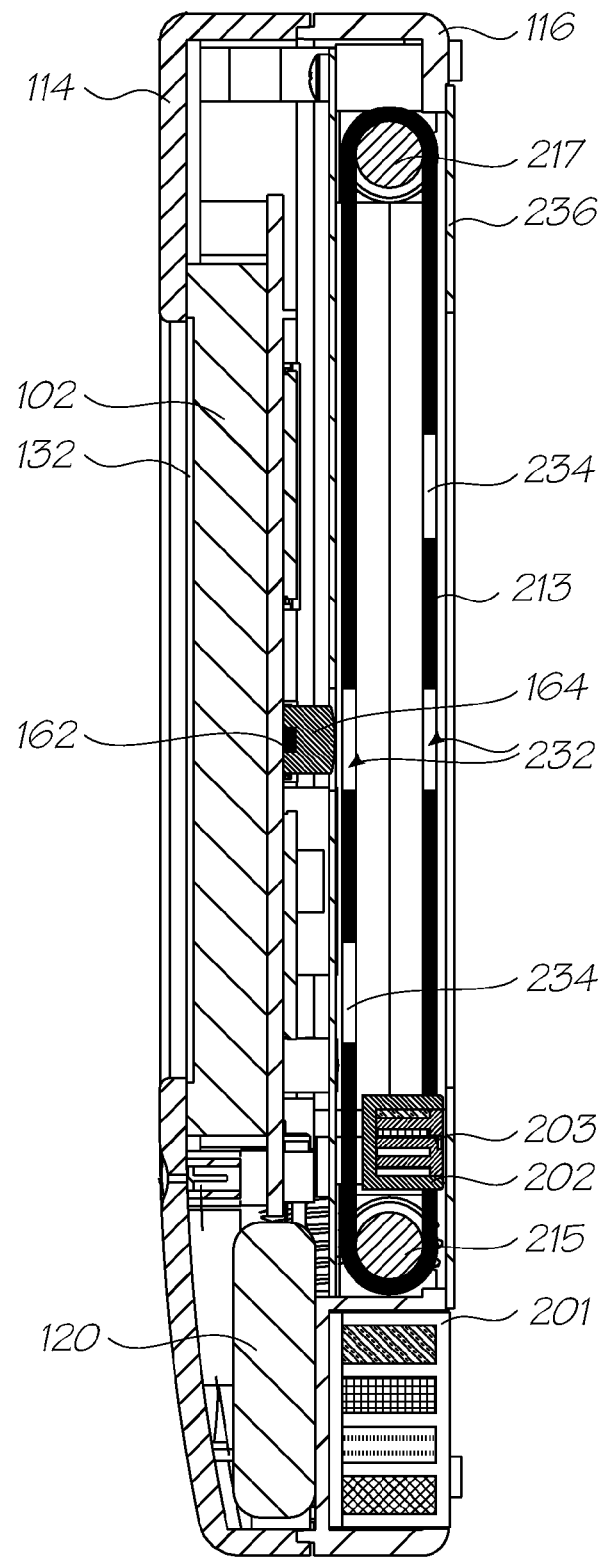
FIG. 7 is a cross-sectional view taken along line AA of FIG. 5.
Figure 8:
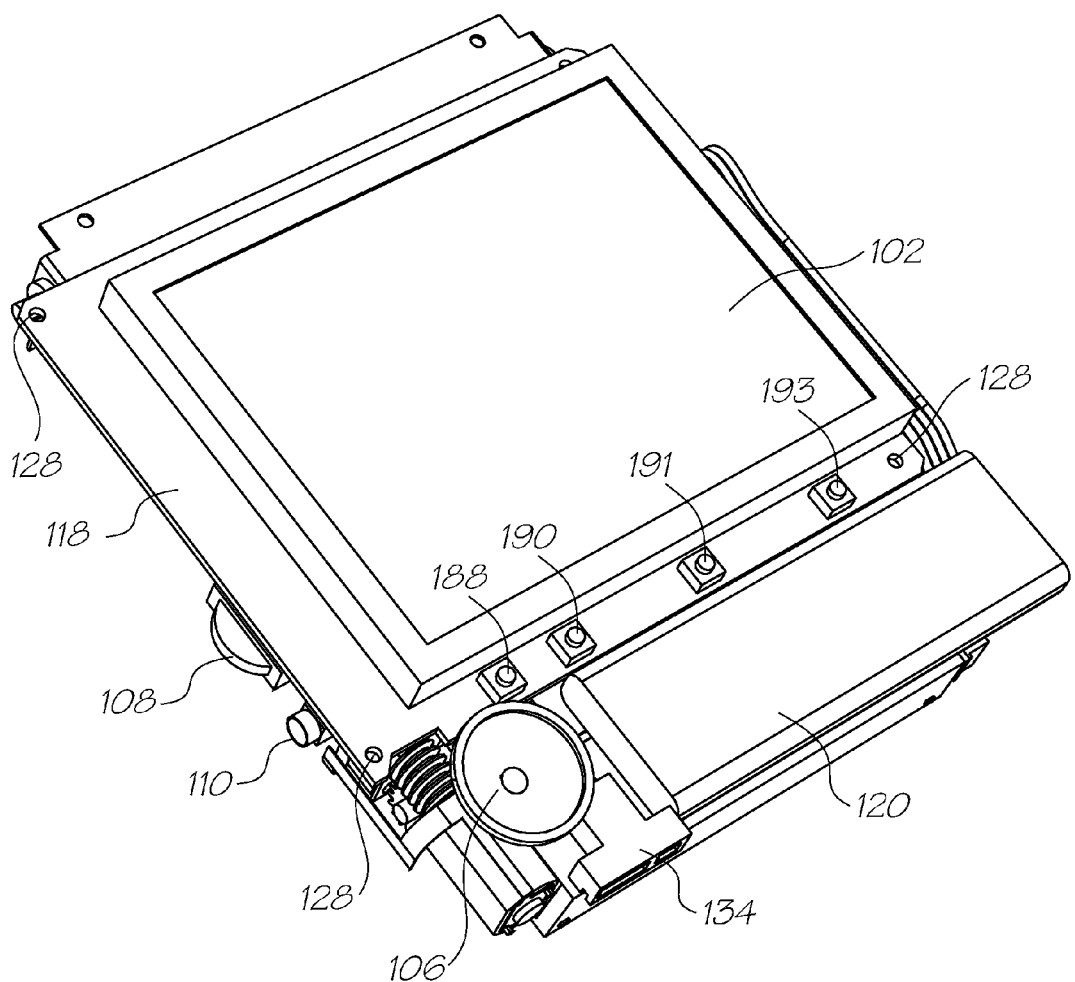
FIG. 8 is a perspective view from above of the internal components of the FIG. 1 device.
Figure 9:
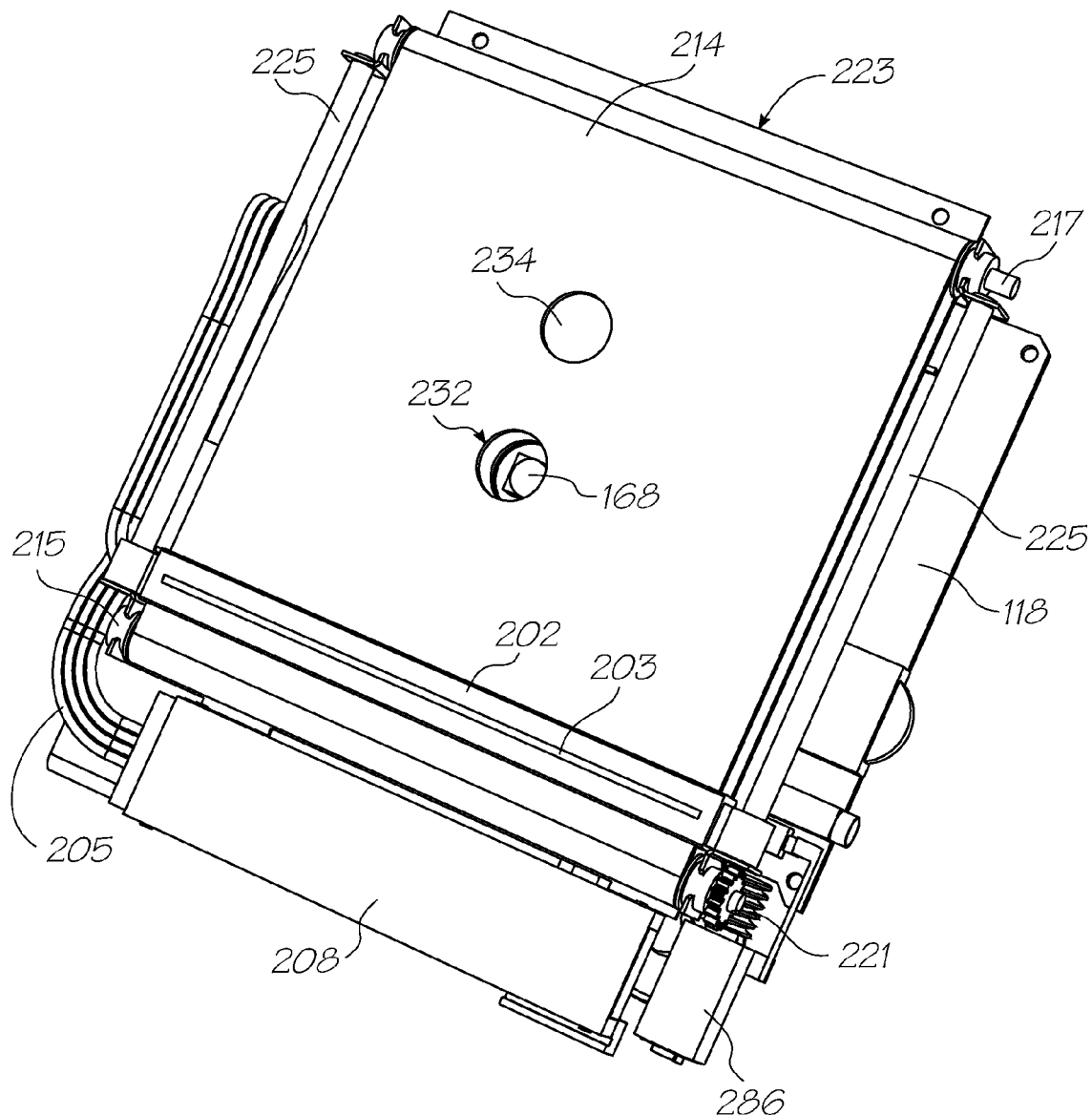
FIG. 9 is a perspective view from below of the internal components of the FIG. 1 device.
Figure 10:
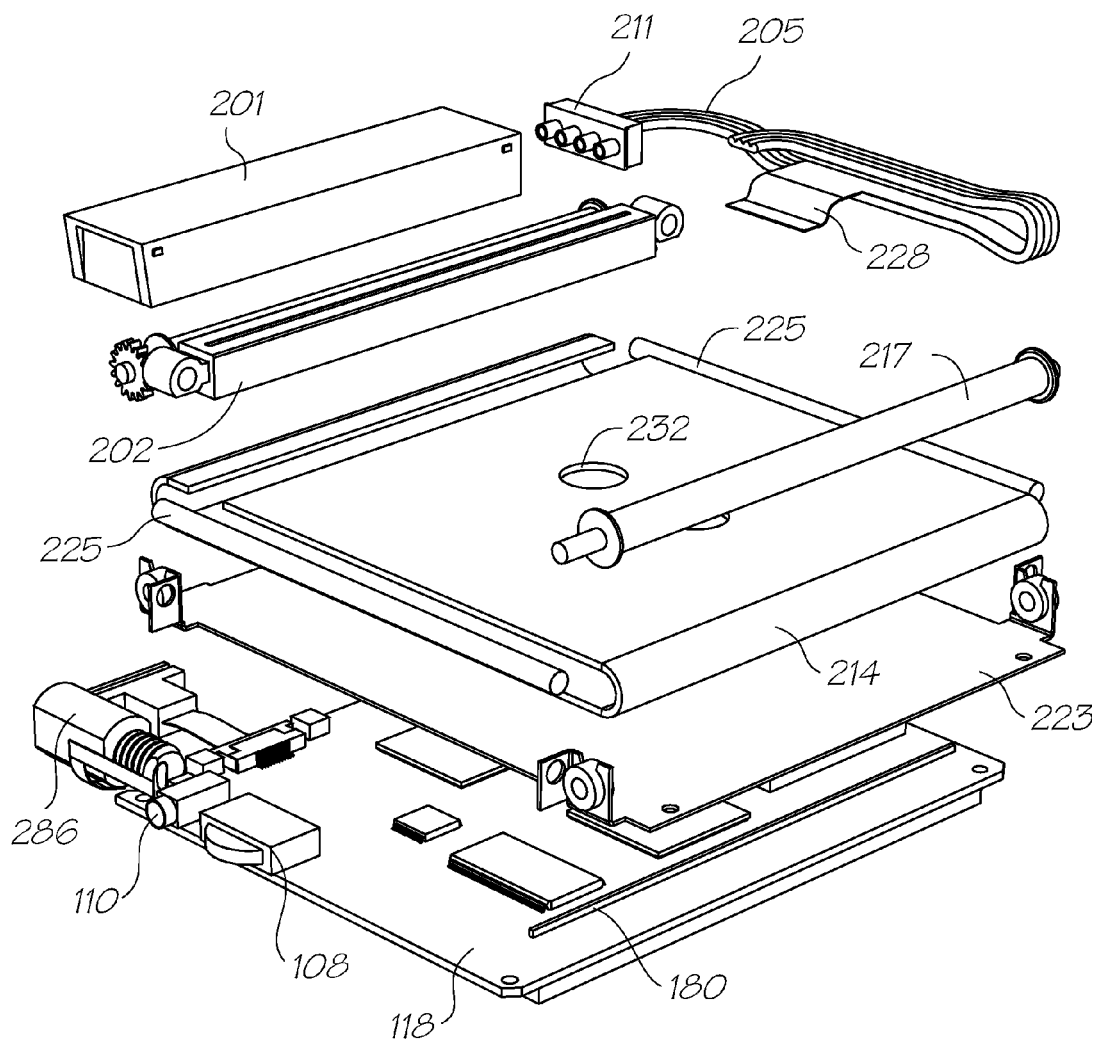
FIG. 10 is an exploded perspective view of the underside of the PCB of the FIG. 1 device.

Referring to FIGS. 1 to 10, there is shown a viewer 100. The viewer has a color LCD screen 102, control buttons 186, 192 & 194, a speaker 106, volume control 108, an audio out jack 110, a printer assembly and a infrared sensing device 112. The LCD screen 102 has a touch sensitive overlay 132.

The viewer 100 is a netpage system enabled device and communicates with a netpage system in a similar manner to that disclosed in the co-pending applications referred to earlier and in particular to applications U.S. Ser. No. 09/722,142 and U.S. Ser. No. 09/721,893.

The viewer 100 has upper and lower moldings 114 and 116 respectively which encapsulate a PCB 118 and all of the electronic components are mounted on or connected to this PCB. Power for the device is supplied by a rechargeable 3 volt lithium ion battery 120. The battery is not user replaceable and is located within the casing.

The PCB 118 and attached electronics is attached to the upper molding 114 by screws 125. The printer assembly is attached to the lower molding 116 by screws 127, which pass through the chassis 223 into bosses 242 in the lower molding 116.

The two moldings 114 and 116 are joined together by four screws 124, which extend through the lower molding 116 to engage the upper molding 114.

The PCB includes four electrical switches which are acted on by the push buttons. The zoom buttons 186 allows the view to be zoomed in, zoomed out, and, when activated simultaneously, to be reset to normal scale. The snap button allows the nearest dynamic or interactive object to be snapped to the screen. It more generally allows the current view to be de-synchronized (or 'frozen' or 'lifted') from the underlying page. Optional pan controls allow the view to be panned independently of the underlying page. The power button allows the viewer to be switched on and off. The volume control, in the form of a potentiometer, allows the volume of the viewer's audio output to be controlled. The audio output is used to play audio content associated with a page, and optionally to provide operating feedback to the user.

A combined data and power connector 134 is connected to the PCB and is accessible via opening 136 in the casing. The connector 134 includes a power input socket 138 for recharging of the battery 120 and a data socket 140 for input/output of data to and from the device. The connector 134 is connected to the PCB via a flexible PCB 142 and connectors 144 and 146.

The speaker 106 is also connected to the PCB at its lower edge via connector 148 and is positioned between the PCB and the lower edge of the casing. The speaker may be hard wired to the PCB rather than being provided with a removable connector.

Digital audio generated by the viewer is converted to analog via a digital-to-analog converter (DAC) 173, is amplified by an amplifier 177 subject to the volume control 108, and is output to a speaker 106 or to an external audio device via an audio out jack 110. The speaker is disabled when the audio jack is in use.

The volume control 108 and audio out jack 110 are mounted directly on the left hand side of the PCB and are accessible via openings 154 and 156 respectively in the left hand side of the casing.

The battery 120 is also positioned between the PCB and the lower edge of the casing. A removable connector 150 is provided to connect the battery to the PCB. However, since the battery is not intended to be user replaceable, a permanent connection may be used. The battery is preferably shaped to fit the casing and accordingly has a beveled corner 152.

Mounted on the lower surface of the PCB is the optical sensor device 112 capable of detecting infrared markings on a substrate. The sensing device 112 comprises an infrared LED 160 and an image sensor 162. In use infrared light is emitted from the LED 160 and passed through an optical guide 164 and then through an aperture 166 in the lower molding. Reflected light passes through the aperture 166, the optical molding 164 and is focused onto the CCD 162. The optical molding preferably includes a lens 168 and may include a beam splitter/combiner to allow light from and to the LED and the CCD to follow the same path. The LED 160 may be strobed in synchrony with image capture to prevent motion-blurring of captured tag images. The image sensor 162 typically consists of a 200×200 pixel CCD or CMOS image sensor with a near-infrared bandpass filter.

The PCB also includes a processor chip 170, DRAM 172, flash ROM 174, a display controller 270 for controlling the LCD, a transceiver chip 178 and an aerial 180.

In order to display video, the color display 102 usefully has a 4:3 aspect ratio, although with the advent of DVD and digital broadcasting, digital video content with wide screen aspect ratios of 16:9 and wider are becoming more prevalent. The aspect ratio used is not critical. The minimum useful resolution is preferably SIF resolution, which has a square-pixel equivalent of 320×240 pixels. In order to display text, the display preferably has a pitch of at least 100 pixels per inch, giving a maximum diagonal display size of four inches. Larger displays with correspondingly more pixels provide obvious benefits, although with the added expense of a larger form factor and greater processing and communications bandwidth requirements.

The display ideally mimics the optical properties of the underlying paper, i.e. the paper's high reflectivity, high contrast, and Lambertian reflectance function. Although the display may be a conventional back-lit color LCD, such as an active-matrix twisted-nematic (TN) color LCD, it is more usefully a reflective display, such as a passive-matrix cholesteric color LCD from Kent Displays Inc, an electrophoretic display from E Ink Corporation, or a rotating ball display from Xerox Corporation, Inc. It may also be a low cost organic LED (OLED) display.

Display output generated by the viewer is routed to the display 102 via the display controller 270. Assuming a 320× 240 RGB pixel display, the display controller 270 has an associated or embedded 0.25 Mbyte single-buffered or 0.5 Mbyte double-buffered display memory 181.

A dedicated compressed video and audio decoder 171 which produces square-pixel progressive-scan digital video and digital audio output is also provided. To handle MPEG-1 encoded video and audio, a video and audio decoder similar to a C-Cube CL680 decoder may be used. To handle MPEG-2 encoded video and audio, a video and audio decoder similar to C-Cube's ZiVA-3 decoder may be used. An MPEG-1 decoder typically uses a 4 Mbit DRAM during decoding, while an MPEG-2 decoder typically uses a 16 Mbit SRAM during decoding. The decoder memory 179 may be dedicated to the decoder, or may be part of a memory 172 shared with the processor.

The processor 175 controls and coordinates the various electronic components of the viewer. The processor executes software which monitors, via the sensor(s) 112, the identity of the underlying page and the position of the viewer relative to the page; communicates the identity and position data to a netpage base station via the wireless transceiver 183,178; receives identity- and position-related page data from the base station via the transceiver; renders user output to the color display 102 and audio output; and interprets user input captured via the user interface buttons 104 and the screen's touch sensor 132. The embedded software executed by the processor is stored in the non-volatile memory 174, which is typically a ROM and/or flash memory. Identity information unique to the viewer, as well as communications encryption keys, are also stored in non-volatile memory. During execution the processor utilizes faster volatile memory, typically in the form of a 256 Mbit (32 Mbyte) dynamic RAM (DRAM) 172.

Figure 28:
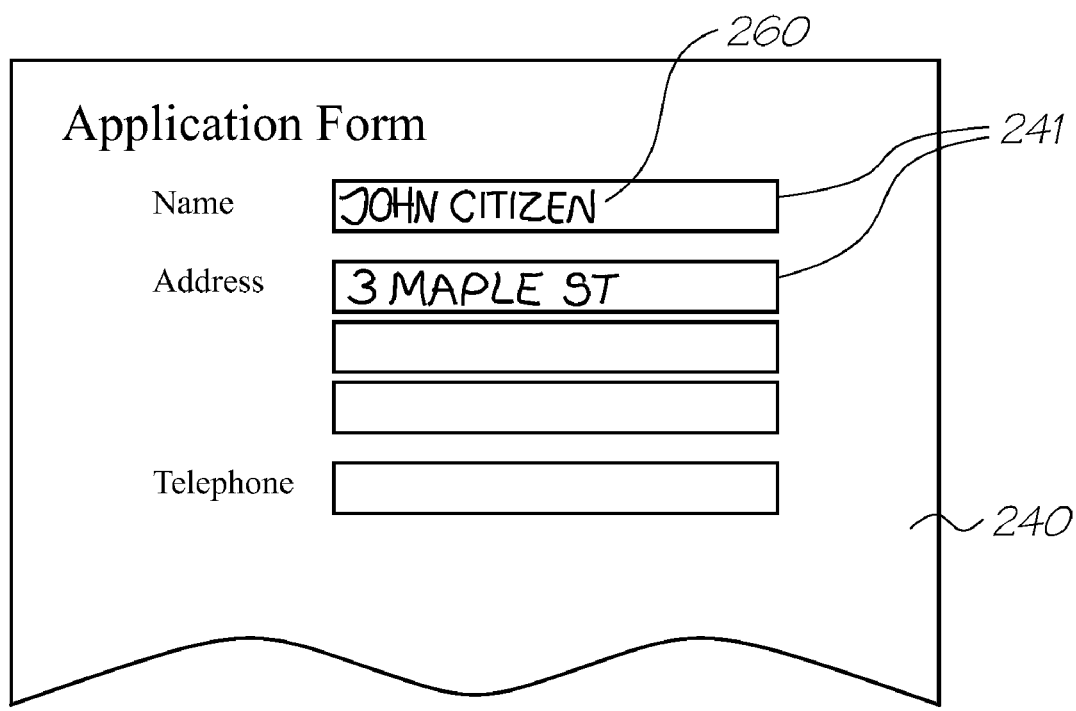
FIG. 28 shows the "fill-in" form of FIGS. 26 & 27 after printing on by the viewer.

The processor 175 communicates with the other components via a shared bus 280. The processor 175, the bus 280, and any number of other components may be integrated into a single chip. As indicated in FIG. 28 the integrated components may include the digital transceiver controller 183, the video decoder interface 187 and the tag image sensor interface 185. If a fingerprint sensor 189 is provided a fingerprint sensor interface 191 may be incorporated in the integrated components. In a more highly integrated chip, the integrated components may also include the display controller 270, the image sensor 112, the compressed video and audio decoder 171, the audio digital-to-analog converter (DAC) 173 and the memory 172. The analog radio transceiver 178 is unlikely to be integrated in the same chip, but may be integrated in the same package. A parallel interface 193 links the buttons 104, touch sensor 132 and the LED 160 to the bus 280.

The processor 175 is sufficiently powerful to render page content at interactive rates, i.e. at least 10 Hz, and to transform video decompressed by the video decoder and merge it with other page content. If it is sufficiently powerful, then it may also perform video and audio decoding, obviating the need for a video and audio decoder.

The transceiver 178 is typically a short-range radio transceiver. It may support any of a number of wireless transmission standards, including Bluetooth/IEEE 802.15, IEEE 802.11, HomeRF/SWAP, HIPERLAN, and OpenAir. Bluetooth/IEEE 802.15, IEEE 802.11-1997, HIPERLAN, OpenAir, and HomeRF/SWAP all support transmission rates in the range of 1 to 2 Mbit/s. IEEE 802.11b supports transmission rates of 5.5 Mbit/s and 11 Mbit/s. HIPERLAN also supports a transmission rate of 24 Mbit/s in an alternative mode. Beyond these currently-supported wireless LAN (WLAN) standards, next-generation WLAN standards promise to support transmission rates of 100 Mbit/s and higher.

The viewer may alternatively be connected to the a base station by cable, or may utilize a non-radio-frequency wireless transport, such as infrared. IEEE 802.11, for example, optionally utilizes an infrared transport. IrDA also utilizes an infrared transport.

The lower surface of the lower casing 16 is provided with four outer feet 182 and four inner feet 184. The outer feet are located near the corners of the device whilst the inner feet 184 are located at the corners of a square centered on the lens 168.

All eight feet extend the same distance and enable the device to be placed on a planar surface with a small gap between the surface and the general plane of the lower molding. The feet have a rounded contact surface and this aids in sliding the device across the surface. The inner feet 184 ensure that if one or more of the outer feet 182 are not supported the device does not tip relative to the surface. They also aid in keeping the surface flat near the sensing device 112.

The sensor device 112 is infrared sensitive. The CCD 162 is sensitive to infrared light, either inherently or by use of filters and the LED 160 emits infrared light, again inherently or by use of filters. The lens 168 is focused on the plane of the inner and outer feet 182 and 184, as this is where a substrate to be sensed will be located. The sensor device is capable of detecting infrared absorptive tags, such as netpage tags. For a full description of the processes involved, reference is made to our co-pending application U.S. Ser. No. 09/721,893 referred to earlier. The CCD 162, the LED 160 and processing functions incorporated in the processor chip 170 are similar to those disclosed in the co-pending application.

The device is thus capable of sensing and decoding netpage tags on a substrate. Image data captured by the CCD 162 is sent to the processor chip 170 and decoded to a region ID (or page ID) and a tag ID. The region ID and tag ID, together with other necessary information, is transmitted to the netpage system via the transceiver chip 183,178. The netpage system resolves the region ID and tag ID to corresponding document data which it transmits back to the device. The processor receives the document data via the transceiver, and renders the data for display on the color display 102 via the display controller 270.

The LCD screen 102 is overlaid with a touch sensitive overlay 132. When viewing information via the LCD screen, the screen will include controls to enable the user to control the device by touching the screen with a non-marking stylus.

The viewer 100 also includes a printer assembly, which is located in the body of the viewer.

The print assembly includes a printhead assembly 202 and an ink cartridge 201 connected together by a hose assembly 205. The printhead assembly 202 includes a printhead 203. The lower molding 116 has an ink cartridge compartment 208 to enable user replacement of the ink cartridge 201. The compartment 208 is accessed via cover 209. The hose assembly 205 includes a connector 211 for connecting to the ink cartridge.

The print assembly is preferably an inkjet type printer and more preferably a full-color inkjet. Accordingly the ink cartridge 201 includes multiple inks In the preferred embodiment the print assembly is a full-color CMY or CMYK printer and the ink cartridge 201 includes three or four separate ink chambers 252. Whilst any inkjet printhead may be used, more preferably the printhead is a microelectromechanical system (MEMS) type printhead (Memjet), such as that disclosed in our co-pending application U.S. Ser. No. 09/575,141.

A Memjet printhead provides a combination of printhead width, compactness, low power consumption, and low cost which makes it uniquely suitably for integration in the printing viewer. Although a Memjet printhead provides 1600 dpi resolution, a printing viewer may get by with less. If the printing viewer is sufficiently small, then an area printhead can be used rather than a scanning printhead.

The printhead assembly 202 extends across at least the full width of the LCD screen 102 and prints by moving upwards or downwards. The printhead assembly 202 is mounted on a continuous elastomeric belt 213 which runs around rollers 215 and 217 located at the top and bottom of the screen. The lower roller 215 is driven by a DC stepper motor 286 via a worm gear 221. The two rollers are mounted on a printer chassis 223. Mounted on each side of the chassis 223 are transverse rods 225. The printhead assembly 202 is mounted on these rods 225 and these rods maintain the printhead in the correct position; the belt 213 merely causes the printhead assembly 202 to move backwards and forwards along the rods 225.

The lower molding 116 is provided with a rectangular aperture 250 and a metal base plate 236 is attached to the underside of the molding 116. The base plate 236 has a rectangular aperture 252 sized so that the printhead assembly 202 is not exposed when at either extreme of its travel. The base plate is preferably attached to the lower molding 116 by an adhesive.

The operation of the print assembly 202 is controlled by a dedicated print engine/controller (PEC) chip 281 located on the PCB 118. An example of a suitable PEC is described in our co-pending application U.S. Ser. No. 09/575,108. The PEC chip 281 generates bi-level dot data for the printhead in real time and otherwise controls the operation of the printhead. Communication with the printhead assembly 202 is via a flexible PCB 228 which engages the PCB 118 via connector 230. The DC motor 286 is connected to the PCB via a flexible PCB 231.

A master QA chip 282, for example as described in our co-pending application U.S. Ser. No. 09/113,223, is provided which the PEC uses to authenticate an identical QA chip 283 embedded in the replaceable color ink cartridge 201. A raster image processor (RIP) DSP 284 may be used for rendering print data at high speed. Depending on the desired print quality and speed and the performance of the processor, the RIP DSP may be omitted with the processor performing rasterization. Depending on the need to accurately control ink quality and to monitor consumption, and on the availability of alternate mechanisms for detecting ink depletion, the inclusion of the QA chips may not be needed.

Figure 29:
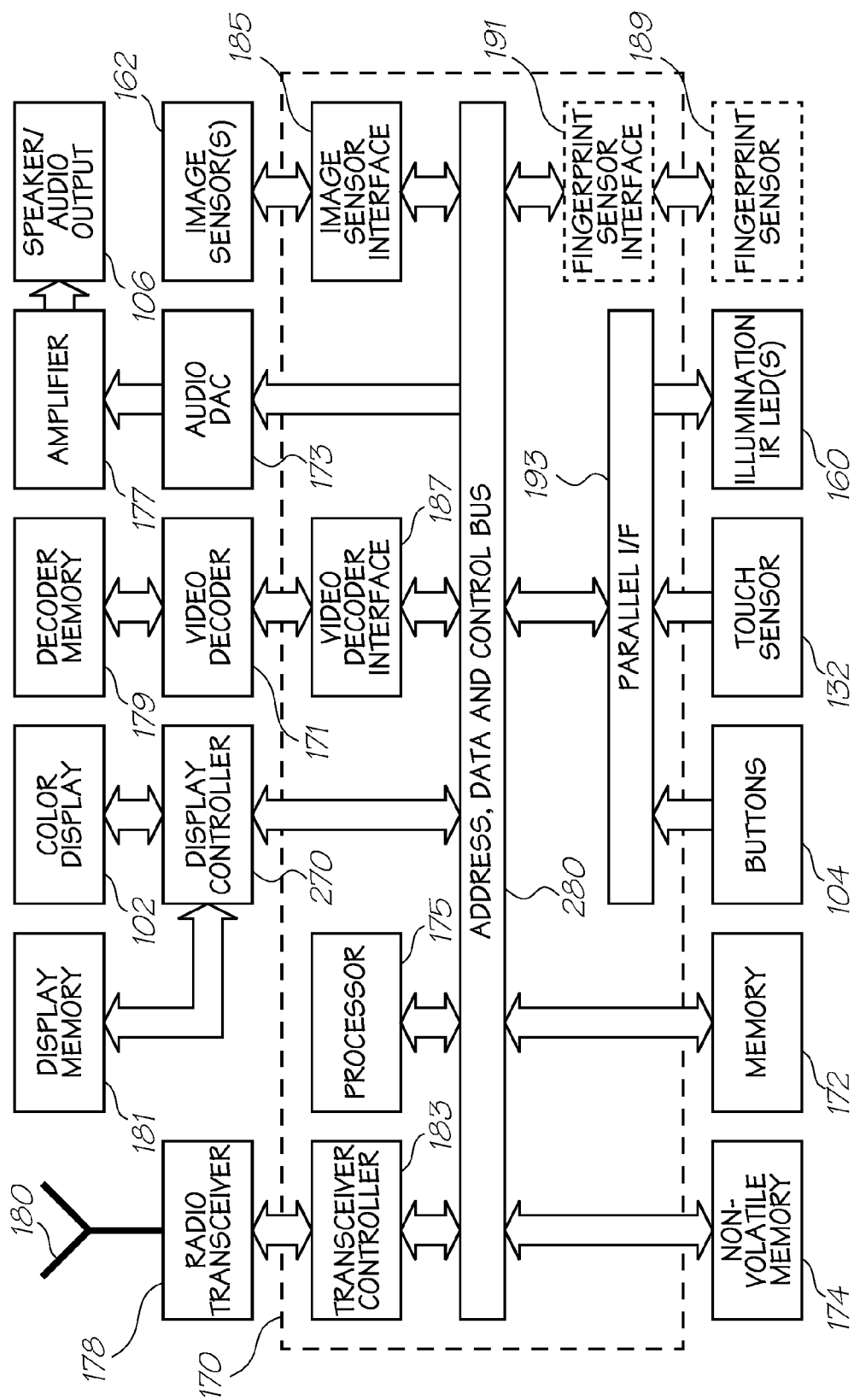
FIG. 29 shows a schematic of part of the viewer's electronic components, relating to file download and display.
Figure 30:
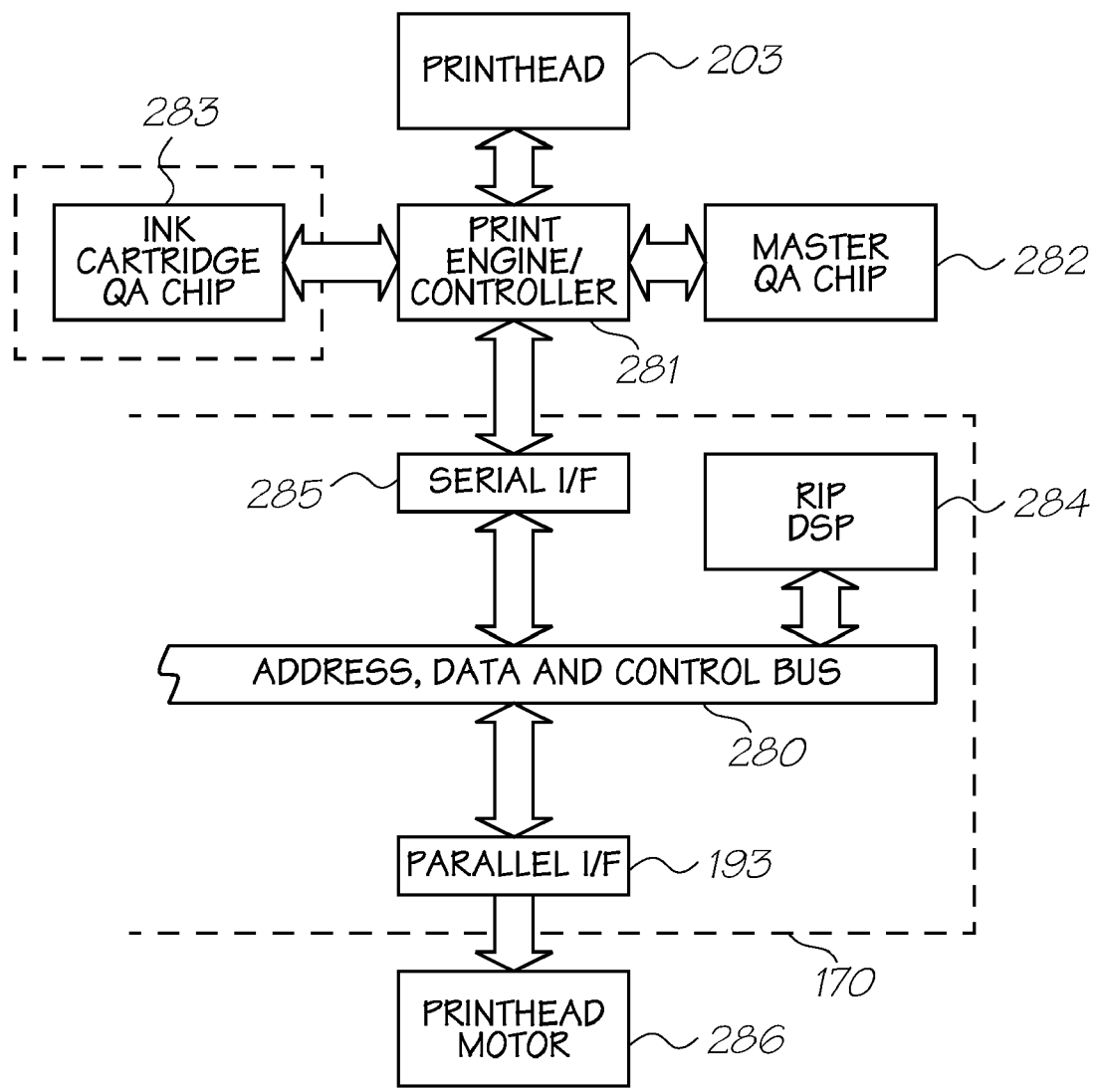
FIG. 30 shows a schematic of part of the viewer's electronic components relating to control of the printer functions.

Referring to FIG. 29, the processor 175 typically communicates with PEC 281 via a serial bus 285. The serial bus 285 may be high-speed or low-speed depending on the desired print quality and speed. The processor 175 controls the stepper motor 286 which moves the printhead assembly 202 via the parallel interface 193.

The elastomeric belt 213 and the printhead assembly 202 extend across the full width of the screen 102 and by necessity obscure the sensor 112 as the printhead assembly moves between the rollers 215 and 217. The belt 213 is provided with two pairs of circular apertures 232 and 234. The first pair 232 align when the printhead assembly 202 is adjacent the drive roller 215. The second pair 234 align when the printhead assembly 202 is adjacent the other roller 217. When the apertures align the sensor 112 may sense coded data on a substrate below the viewer. When the apertures 232 and 234 do not align the sensor 112 cannot sense any data on the substrate.

The viewer may be designed so that the code sensor has a view of the surface during printing. The code sensor itself can then be used to detect movement. Movement detected in this way can be used to terminate printing. It can also be used to modify the print data in real time so that the print data is properly registered with the underlying page at all times. Multiple code sensors may be used if located around the periphery of the viewer.

An accelerometer may be included in the viewer to detect movement of the viewer during printing. If movement is detected, then printing can be immediately terminated.

Usage

Figure 11:
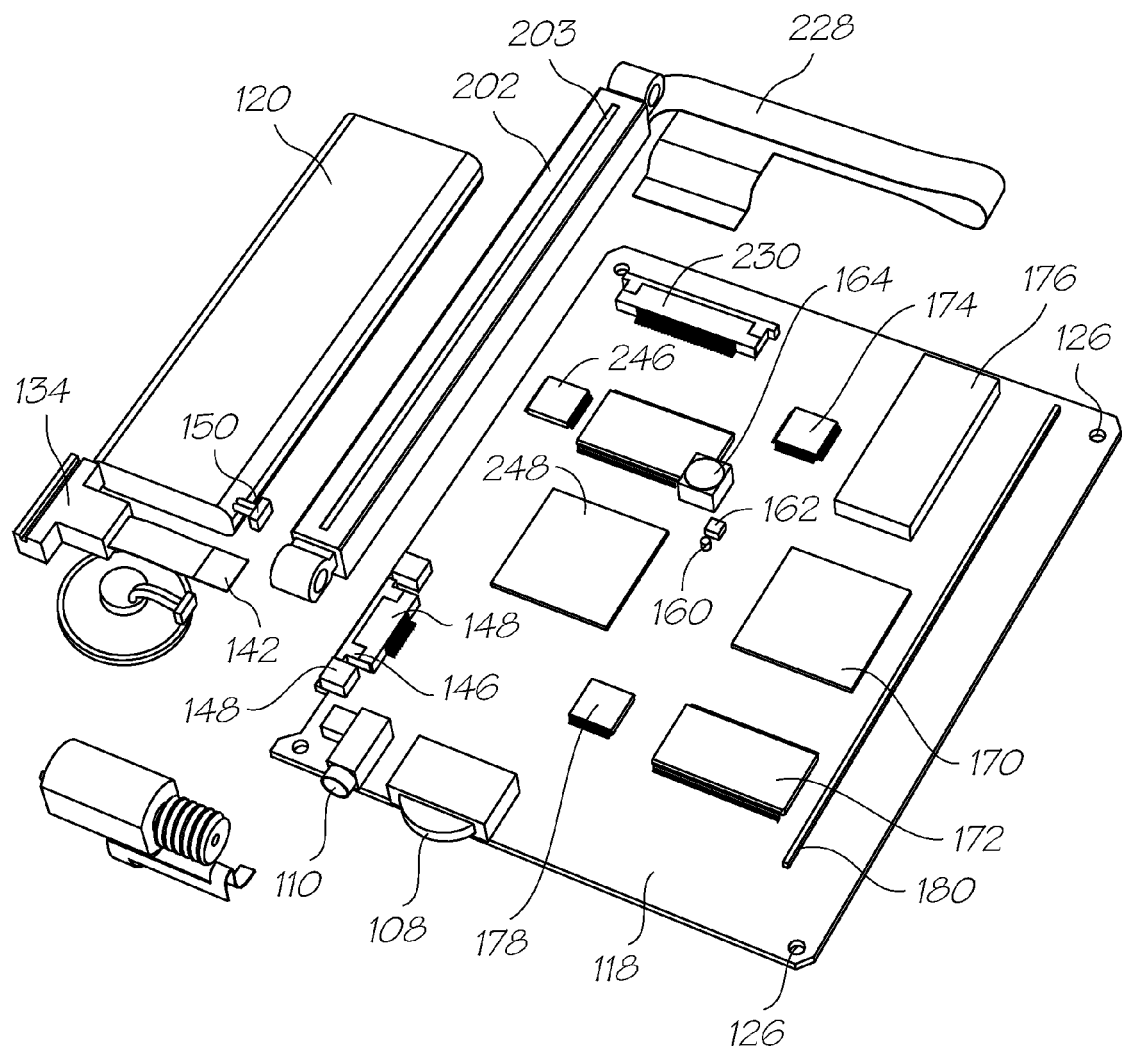
FIG. 11 is a plan view showing the FIG. 1 device in use on a coded substrate in a first orientation.
Figure 12:
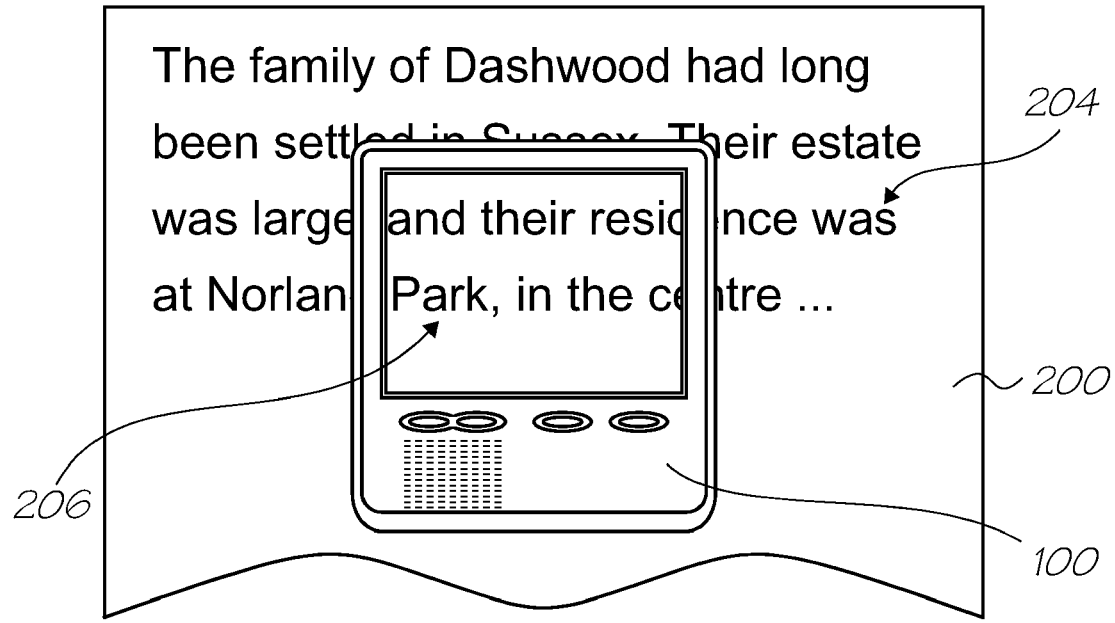
FIG. 12 is a view from the side of the FIG. 11 arrangement.

Referring to FIGS. 11 and 12, in use the device 100 is placed on a substrate 200 having netpage tags tiled over its surface. The substrate 200 may be paper, electronic paper such as used by E Ink Corporation, a plastic sheet or any other suitable substrate. As seen in FIG. 12 the sensor device 112 senses one or more of the tags, decodes the coded information and transmits this decoded information to the netpage system. In FIG. 11 the substrate carries human readable text 204 and so is readable without the device 100.

The device may be used with a surface which only carries netpage tags and so appears as a blank document to a user without an authorized viewer. As discussed in our earlier applications, each tag incorporates data which identifies the page it is on and its location within the page. The netpage system is thus capable of determining the location of the viewer 100 and so can extract information corresponding to that position. When displaying static images or text the displayed information usually corresponds to the human discernable text or other markings 204 on the substrate. Additionally the tags include information which enables the device and/or system to derive an orientation of the device relative to the page from the tags. This enables the information displayed to be rotated relative to the device to match the orientation of the text 204. Thus information 206 displayed by the viewer appears to be what is on the page in the corresponding position under the viewer.

When the viewer first comes into contact with a new page, it downloads the corresponding page description from the relevant page server. It then renders the viewer's view according to the current view transform, i.e. according to the viewer's current zoom setting and its position and rotation relative to the underlying page. Whenever the view transform changes, i.e. because the user moves the viewer or changes the viewer's zoom setting, the viewer re-renders the view according to the new view transform. For the purposes of the following discussion, the size of the viewer's window onto the page is also assumed to be part of the view transform.

Whenever the view transform changes, the viewer transmits the view transform to the netpage page server responsible for the underlying page. This allows the page server to commence streaming dynamic objects which have come into view and to cease streaming dynamic objects which are no longer in view. It also allows the page server to provide the viewer with static objects, such as images, at a suitable resolution.

As the device is moved the sensor device 112 images the same or different tags, which enables the device 100 and/or system to update the device's relative position on the page and to scroll the LCD display as the device moves. The position of the viewer relative to the page can easily be determined from the image of a single tag; as the viewer moves the image of the tag changes and from this change in image the position relative to the tag can be determined. The system "knows" the absolute position of the tag on the page from its tag ID and so the absolute position of the viewer on the page may be derived. The viewer senses tags, and thereby its time-varying position relative to the substrate, and sufficiently frequently that movement of the viewer results in a smooth, as opposed to a jerky, scrolling of the display.

Figure 13:
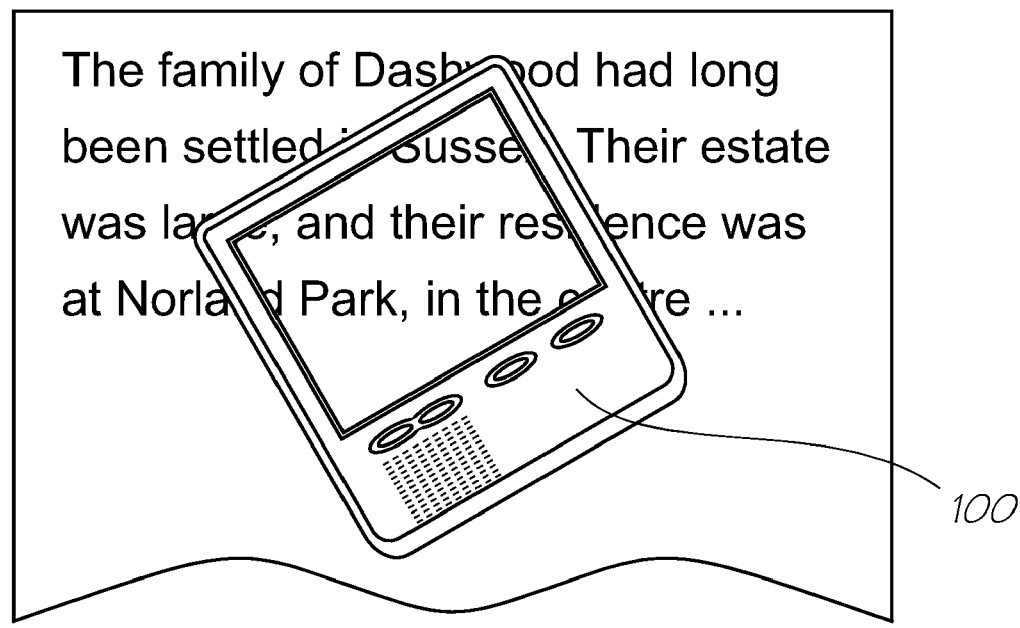
FIG. 13 is a plan view of the FIG. 1 device in a second orientation on the substrate of FIG. 11.

The information 206 displayed in the viewer is preferably aligned with the text 204 on the page 200, so that it appears as if the viewer 100 is transparent. Thus the orientation of the viewer 100 does not alter the orientation of the displayed information 206, as seen in FIG. 13.

Figure 14:
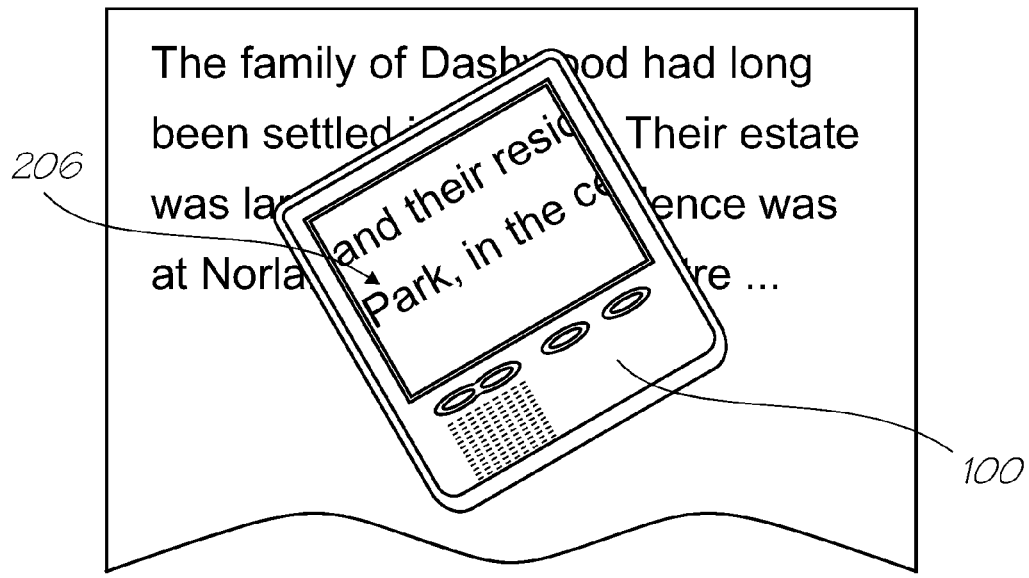
FIG. 14 is a plan view of the FIG. 1 device viewer showing a 'lifted' view of a page.

However, as seen in FIG. 14, the text 206 displayed on the LCD screen 102 need not remain aligned with the physical text but may remain aligned with the viewer 100. The user may use the 'snap' button 192 to instruct the viewer to display text aligned with the viewer, not the page text 204.

Figure 15:
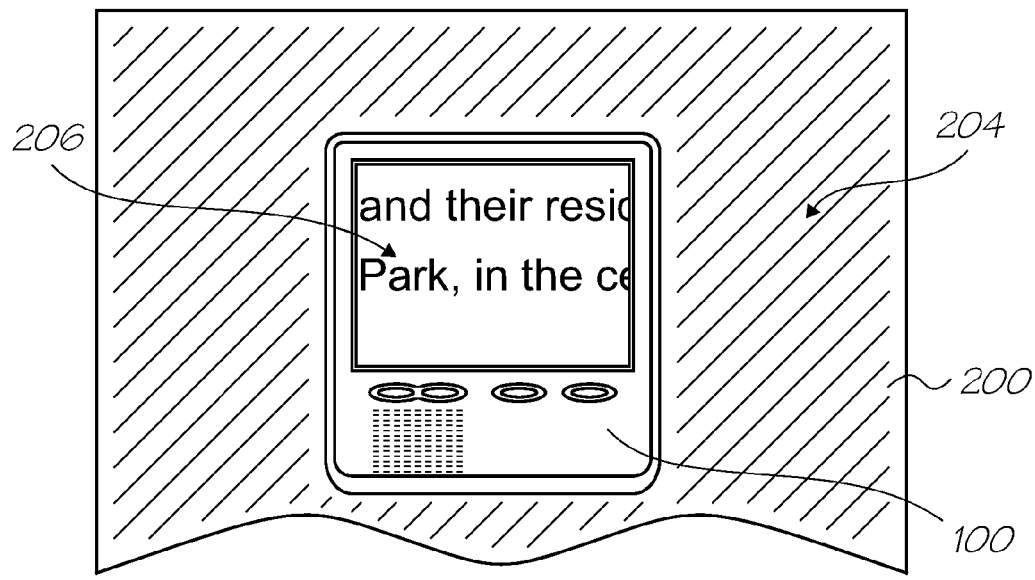
FIG. 15 is a plan view of the FIG. 1 device showing a view of a page in darkness.

The viewer 100, if provided with backlighting of the LCD 132, is capable of displaying information in the dark. FIG. 15 shows a page 200 with a viewer 100 displaying information 206 corresponding to information on the page which is not visible due to lack of ambient light.

Figure 16:
FIG. 16 is a plan view of the FIG. 1 device showing a 'zoomed-in' view of a page.
Figure 17:
FIG. 17 is a plan view of the FIG. 1 device showing a 'zoomed-out' view of a page.

Whilst the information 206 shown on the LCD 102 is similar to the printed information 204, it need not be identical. The left hand control button 186 is a rocker type device. When pressed on the left, the button activates switch 188 and when pushed on the right the button activates switch 190. Pushing down centrally or equally on the left and right activates both switches 188 and 190. Pressing on the left switch 186 causes the display to zoom in whilst pressing on the right causes the display to zoom out. Pressing centrally resets the display to the device default, which may be a 1 to 1 ratio. FIG. 16 shows a viewer 100 displaying "zoomed-in" text 206 whilst FIG. 17 shows "zoomed-out" text 206, both being of text 204 on a page 200.

The device is not limited to simply reproducing the text printed on a page. Because the printed text is associated with one or more electronic documents in the netpage system, the device can provide more than just the text to the user. Where a document has references, such as footnotes or hyperlinks, these references may be shown on screen. The user may then view those references by touching the reference on screen. This is picked up by the touch screen overlay 132 and the appropriate information displayed, either in a new window or as an overlay on the existing text. This information may be displayed for a set period, after which the display reverts to its original display. The system may also cause additional information to be shown on the LCD screen automatically. Where the page is mainly text the device 100 may be set to a read mode whereby as the user reads the page the text is recited and output via speaker 106. This would be of benefit to people learning to read, such as children or those learning a foreign language. Using a stylus and the touch screen the user indicates where they are reading and the corresponding text is spoken by the machine. Pronunciation of a word or phrase may be practiced by repeatedly drawing the stylus over the relevant text.

The text displayed need not be the same language as the text on the paper. The device may be set to display a single language, when possible. Thus if a netpage document exists in both English and Italian, for example, the device could be set to display the Italian text even though the printed document is in English. Where a document only exists in one language, the system may be configured to either display the document in that language or nothing except a message to the effect that document is not available in the desired language.

If desired the device may be set to an "automatic recital" mode in which the screen automatically scrolls through the entire document, with or without a corresponding aural recital. An aural recital may also occur without a corresponding display of text. The speed of playback may be controlled by the user. Since each tag on the page identifies the document the device merely needs to sense one tag on the page for those features to be activated.

Depending on the document size and device memory, an entire document may be downloaded to the device or "chunks" of data may be downloaded as required or as expected to be required. A simple text document, even of many pages, is relatively small and may be buffered in its entirety without needing extra memory; the device is capable of playing video, as will be discussed later, and the buffer needed to accommodate variations in data reception for video display is more than sufficient to accommodate most text documents. Where an entire document is downloaded, preferably the download is configured to initially send data corresponding to the location of the viewer on the page.

When viewing text or static images the device may have two modes. The first mode, described above, maintains a correlation between the information displayed on the LCD screen and the position of the device to the substrate. In the second mode, the device may be moved without affecting the display; the scrolling and autoplay feature discussed above being a subject of this feature. To set the device to the second mode the user may press the 'snap' button 192. Once in the second mode movement of the device across the paper does not automatically affect the information displayed. The information displayed continues to correspond to the location when the viewer was placed in this mode. Movement of information across the display in this mode is controlled by the user. A document will continue to be displayed or be accessible until the device is placed on a different netpage encoded substrate, at which point the device may normally revert to its first mode. Alternatively, the user must explicitly revert to the first mode by pressing the 'snap' button again.

Figure 18:
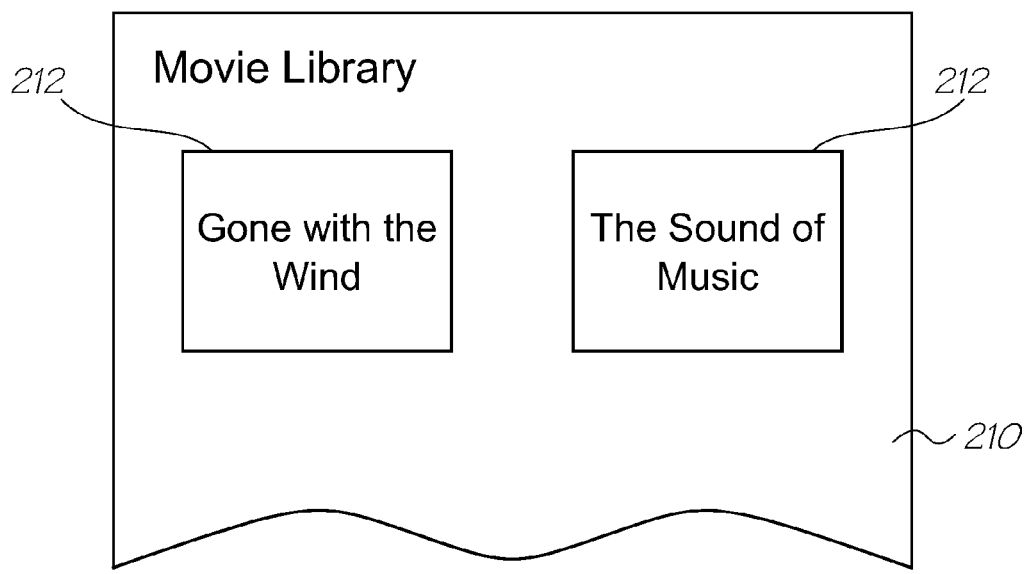
FIG. 18 is an example of a movie library page.
Figure 19:
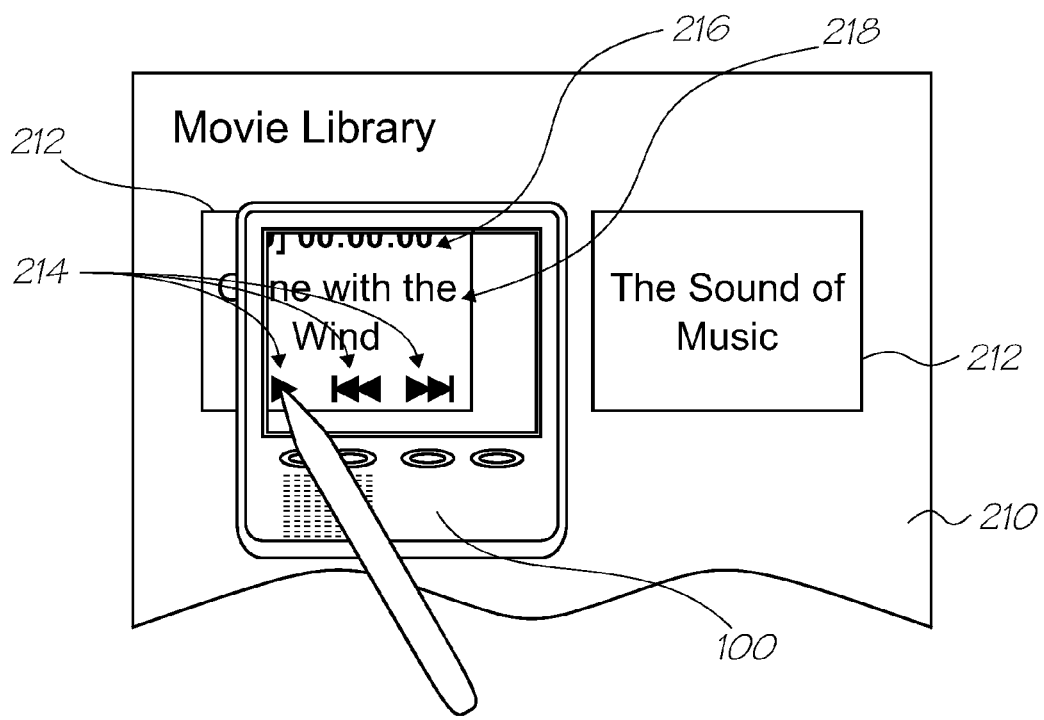
FIG. 19 is a plan view of a viewer showing a view of a playable video clip.
Figure 20:
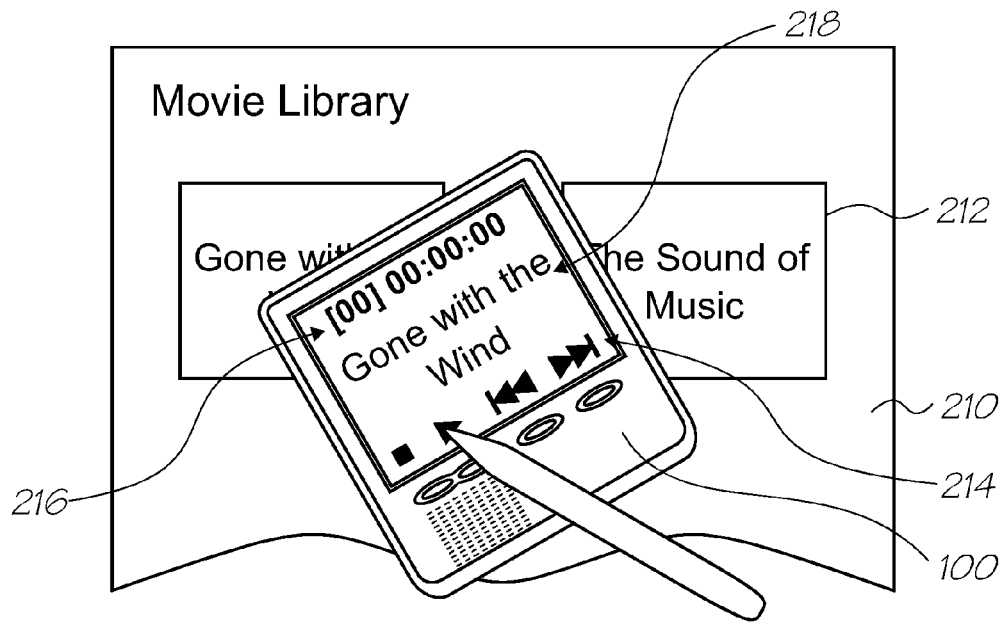
FIG. 20 is a plan view of a viewer showing a snapped and lifted view of a playable video clip.

FIGS. 18, 19 and 20 provide an example of the interaction of the viewer with a video clip. FIG. 18 shows a sample 'movie library' page 210 containing multiple video clip icons 212. Again the page is tiled with netpage tags, not shown. FIG. 19 shows the view the viewer provides of a video clip icon, which includes playback controls 214, which may be activated via the viewer's touch-screen, and the playing time. The screen-displayed information 214,216 remains fixed relative to the displayed text 218 as the viewer moves. FIG. 20 shows the view the viewer shows once the nearest video clip is 'snapped' to the screen, i.e. with the video clip filling the screen, ready to be played. As seen, all of the playback controls and playing time are displayed when the view is snapped. The user snaps the nearest interactive or dynamic object to the centre of the screen by pressing the viewer's snap button. Alternatively or additionally, an interactive object may snap to the screen automatically when activated, e.g. when played in the case of a video clip. In the example, status information and controls are superimposed on the video clip to maximize the video clip's use of the screen. The viewer 100 typically suppresses the display of the status information 216 and playback controls 214 once the clip is playing, either until the clip terminates or until the user initiates further interaction by touching the touch-screen 132. The playing time is preferably displayed in units of hours, minutes and seconds, and is preceded by a current chapter number if the clip has multiple chapters. The playback controls 214 include stop, play, pause, skip backwards and skip forwards. When the clip is stopped or paused, a play button is shown. When the clip is playing, a pause button is shown in place of the play button. The skip controls skip to the start/end of the current chapter, or, if already at the start/end, to the start of the previous/next chapter. If held, rather than pressed momentarily, the skip controls scan backwards/forwards through the clip, i.e. they play the clip at a greater than normal rate backwards/forwards.

As an alternative to on-screen controls, the viewer may provide dedicated playback control buttons which control whichever dynamic object is current. It may also provide a dedicated display, such as a monochrome segment LCD, for the display of chapter (or track) information and playing time.

The viewer streams dynamic objects such as video clips from any number of servers via the current netpage base station. The viewer is optimized to only stream objects which are currently visible on the viewer's screen. When an object ceases to be displayed, it may be configured to automatically pause, or it may continue to 'play' on the server, without consuming communications bandwidth, so that when it is once again displayed its playback has progressed in time as expected by the user.

Figure 21:
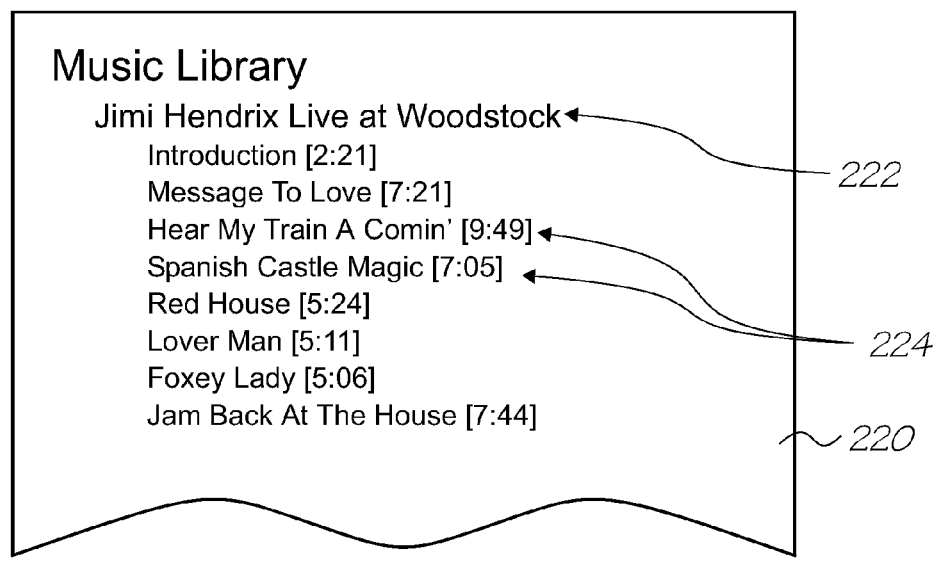
FIG. 21 shows an example of a music library page.
Figure 22:
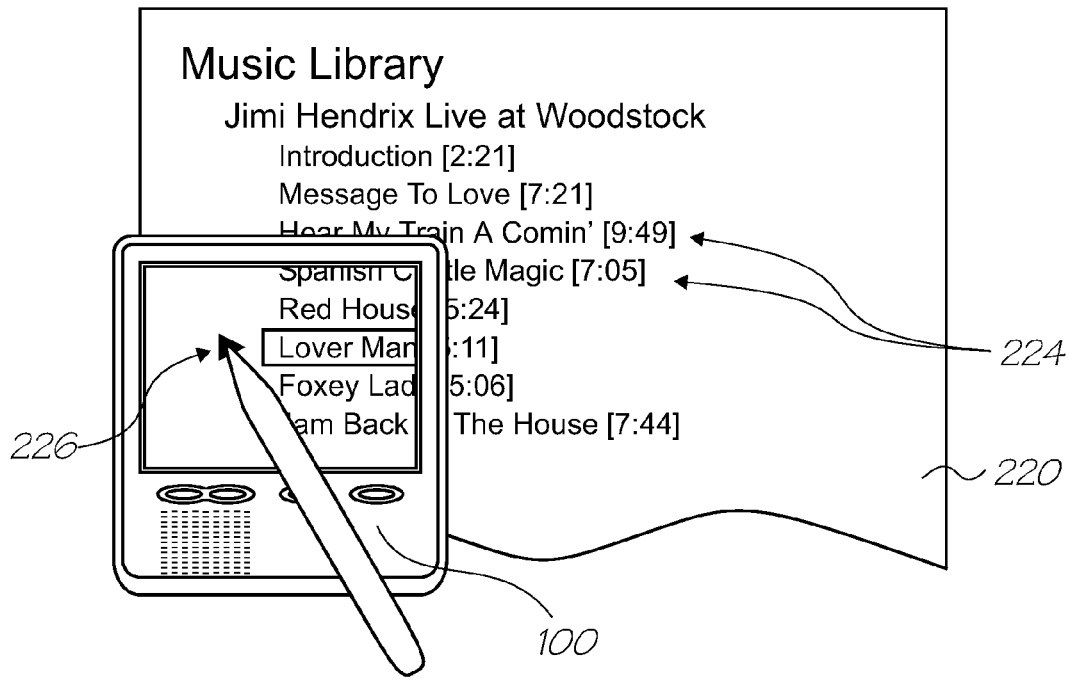
FIG. 22 shows a plan view of a viewer showing a view of playable music clip.
Figure 23:
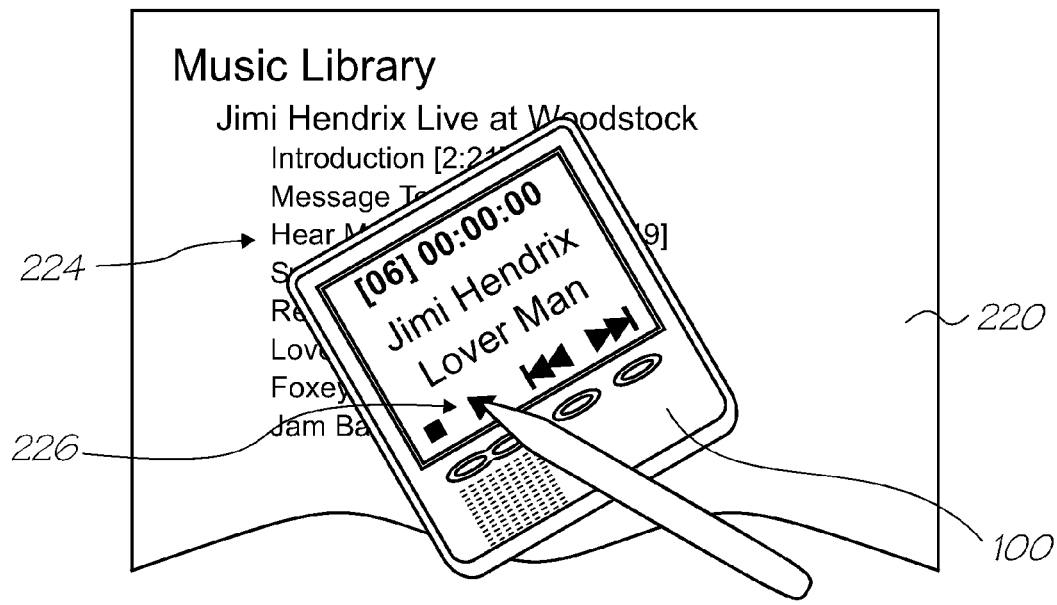
FIG. 23 shows a plan view of a viewer showing a snapped and lifted view of a playing audio clip.

FIGS. 21, 22 and 23 provide an example of the interaction of the viewer 100 with an audio clip. FIG. 21 shows a sample 'music library' page 220 containing multiple audio clip entries 224. The entries may be grouped under a title 222. FIG. 22 shows the view the viewer provides of a set of audio clip entries 224, which includes an indication of a 'current' audio clip entry with an associated play button 226 which may be activated via the viewer's touch-screen. The current entry is preferably simply the entry closest to the center of the screen and so changes as the viewer is moved, unless a clip is playing. If no entry is sufficiently close, then no entry is current. FIG. 23 shows the view the viewer provides once the nearest audio clip is snapped to the screen or selected, i.e. with clip-related information filling the screen. Note that, as illustrated in the example, a snapped view can be quite different from any view directly derivable from the page itself.

As described above, when the viewer is lifted from the page the portion of the page with which the viewer was last in contact remains displayed and interactive. It may also be advantageous for the user to be able to 'freeze' the current view so that the viewer no longer synchronizes the view with the underlying page. When the user snaps the nearest interactive or dynamic object to the screen the view is effectively frozen. When the user presses the snap button again, the viewer once again synchronizes the view with the underlying page. When there is no interactive or dynamic object to be snapped, the viewer may still interpret the snap as a freeze command, but may do no more than rotate the current view so that it is oriented the right way up, i.e. so that the axes of the screen and of the displayed page are aligned. The snap button may therefore be used as a freeze button, but as an alternatively the viewer may provide a freeze button separate from the snap button.

The viewer may provide a mode wherein the axes of the screen and of the displayed page are always kept aligned even though the viewer is otherwise synchronizing the view with the underlying page, i.e. the viewer synchronizes the view according to the position and identity of the underlying page, but not according to the rotation of the underlying page relative to the viewer. This mode has the advantage that the displayed view always looks sensible to the user operating the viewer. It has the further advantage that rotation is never allowed to degrade the quality of the displayed image of the page. If rotation is never respected by the viewer, then the viewer is also freed from ever having to compute a rotated page image. As a compromise, the viewer may respect the nearest multiple of ninety degrees to its actual rotation relative to the page.

Figure 24:
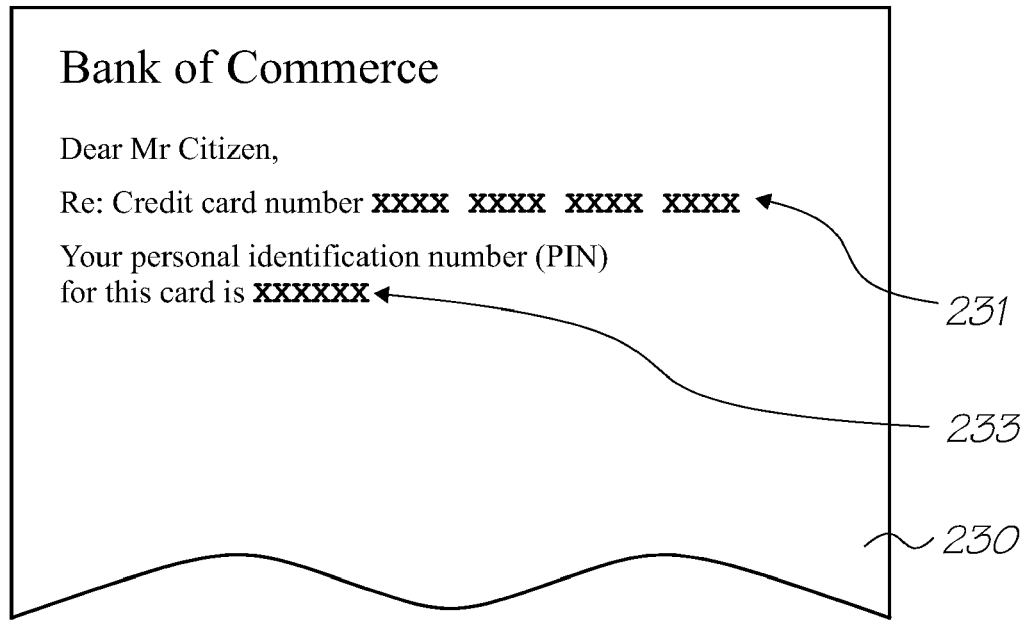
FIG. 24 shows an example of PIN advice letter from bank.
Figure 25:
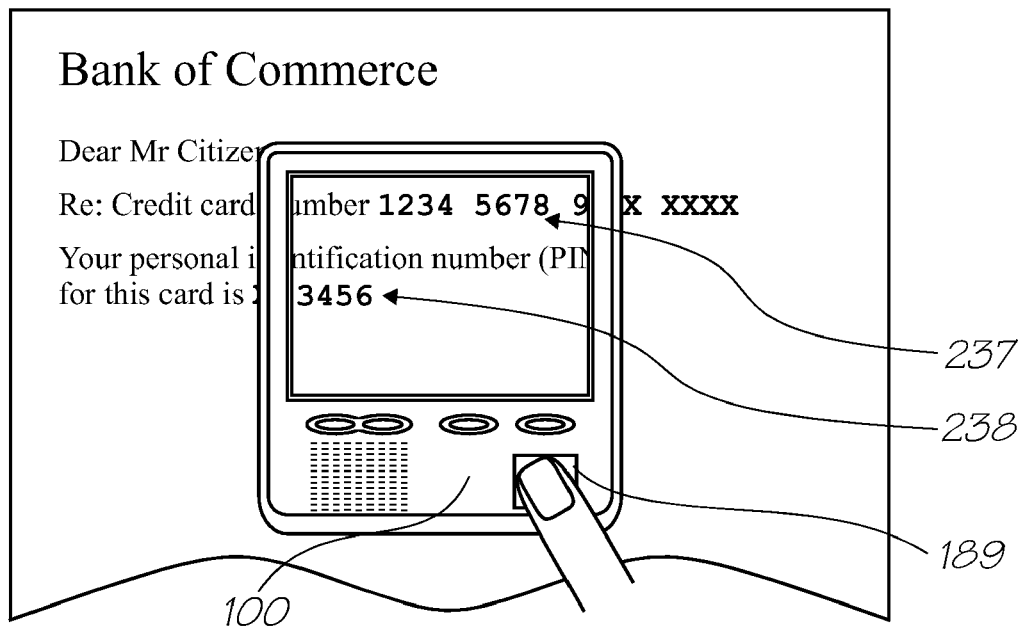
FIG. 25 shows a viewer showing a secure view of personal data.

FIGS. 24 and 25 provide an example of the interaction of the viewer with 'secure' data requiring authorized access. FIG. 24 shows an example personal identification number (PIN) advice letter 230 from a bank. Both the account number 231 and PIN 233 are suppressed on the printed page, i.e. printed as a series of X's. FIG. 14 shows the view the viewer provides of the PIN advice letter. The view shows the actual account number 237 and PIN 238, on the basis that the netpage system has verified that the user of the viewer is the owner of the data. The advice letter is recorded on a netpage registration server as being owned by a particular user, i.e. by the user to whom the letter was originally addressed. The viewer is recorded as owned by the same user. The identity of the actual user is optionally verified with respect to the identity of the owner of the viewer by verifying the fingerprint of the actual viewer against the fingerprint of the owner. The fingerprint, or some other biometric, is recorded by the registration server for the owner. The viewer may incorporate a fingerprint sensor 189 for the purposes of fingerprint capture. Providing a biometric such as a fingerprint or signature to the viewer may place the viewer in a 'secure' mode wherein secure information is accessible for a period of time. An indicator, such as a lit LED, may indicate this mode to the user. Alternatively, secure access is only granted while the user's biometric is being sensed. In the example, the actual account number and PIN is then only shown while the user's finger is in contact with the fingerprint sensor.

Figure 26:
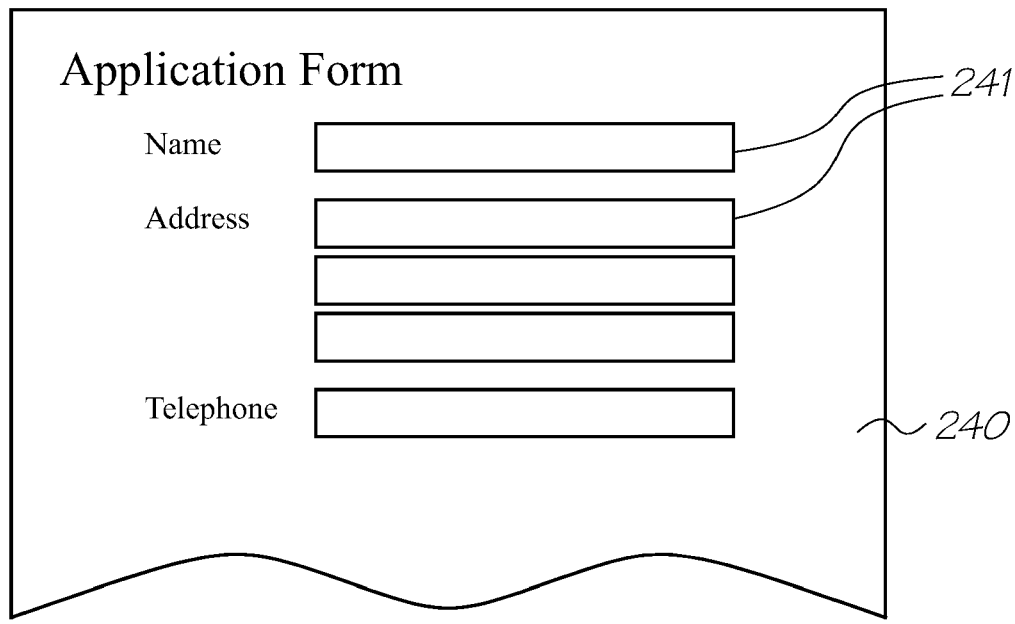
FIG. 26 shows an example of "fill-in" form.
Figure 27:
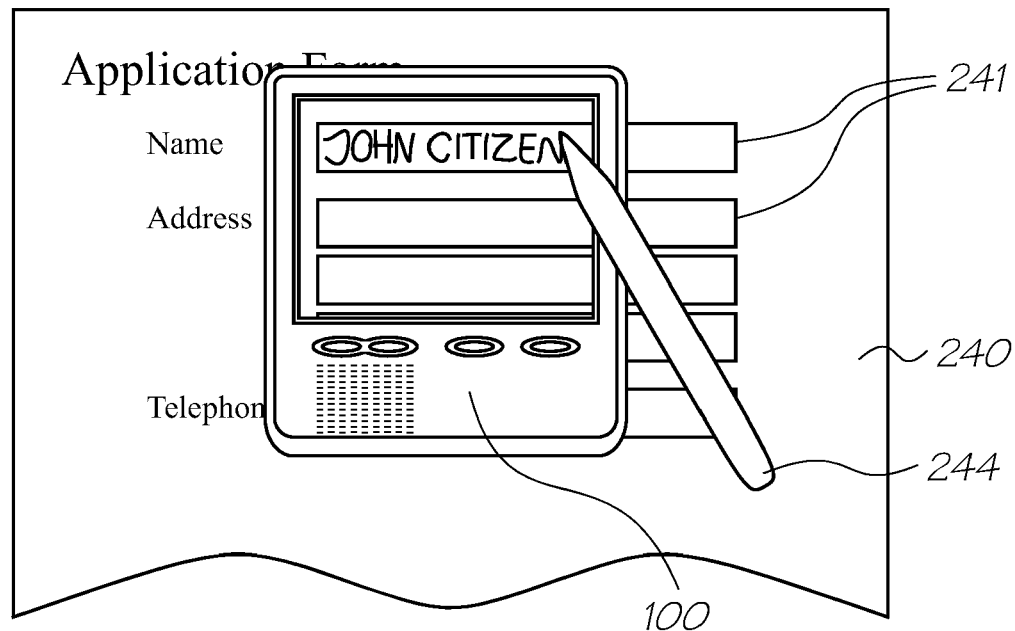
FIG. 27 shows a viewer allowing form fill-in by a user.

FIGS. 26 and 27 provide an example of the interaction of the viewer with a fill-in form 240. The form has a number of fill-in fields 241. FIG. 26 shows an example form. FIG. 27 shows the view the viewer provides of the form. The stylus 244 can be used to fill in the fields of the form via the touch-screen. The example shows the form 240 being filled in by hand, pending handwriting recognition according to normal netpage mechanisms.

Netpage input, in the form of digital ink, is labeled to indicate how it was captured, i.e. through a netpage pen interacting with a printed netpage, or through a stylus interacting with the touch-sensitive screen of a viewer. The digital ink is also labeled with any change in the authorization state of the viewer, e.g. with respect to the presence of the user's finger on the viewer's fingerprint sensor. This allows the page server, when interpreting netpage input in relation to the corresponding page description, to ignore document elements not visible to the user when the input was captured.

Digital ink generated through a viewer is otherwise suitably transformed to look like it came from a netpage pen interacting with the underlying page, i.e. the digital ink is labeled with the page ID of the underlying page, and the coordinates of position samples in the digital ink are transformed from the coordinate system of the viewer into the coordinate system of the underlying page, according to the view transform current when the position sample was captured. As an alternative, the viewer may provide an insertion point specifiable via the stylus, an associated text cursor, and text entry via an on-screen keyboard or via character-wise character entry and recognition, in the manner of current personal digital assistants (PDAs).

The printer is most useful in filling out forms such as that displayed in FIGS. 26 and 27. The users uses the stylus 244 to "write" information onto the display, as shown in FIG. 28. The display is updated to reflect the digital ink captured by the viewer.

Referring to FIG. 28, the print assembly is controlled to print ink 260 in the fill-in fields of the form 240 to correspond to the digital ink captured by the touch screen. Thus at the end of the process an electronic version and a hard copy version of the completed form exist. Printing of the ink 260 may occur as the user fills in each text box or it may occur after completion of the form. Printing after completion enables mistakes or alterations to be made before committing to paper but may require the user to move the viewer across the page to enable printing of all information. Printing as the user fills in the form avoids the need to move the device to print information. However, unless an erasable marking system such as E-ink is used, all mistakes and alterations are printed to the page.

The printer assembly may be used to physically transfers onto the underlying page any virtual markings made by the user via the viewer touch-screen. Virtual strokes can be faithfully reproduced, including colors, textures, line widths, and even subtle brushing effects such as produced by striated brushes and airbrushes. The virtual marking mode of the stylus on the screen can be completely controlled in a position-dependent manner by the active application(s), i.e. as one expects in any graphical user interface.

In the limit case, a user interacts with Netpages exclusively via the Netpage printing viewer, eliminating the need for a Netpage Pen.

The printing viewer is designed to print when stationary with respect to the underlying page. Because the printhead 203 is screen-width, it can transfer the entire contents of the screen 102 onto the underlying page in a single pass. When not printing, the printhead assembly 202 is parked in a recess to prevent accidental damage. To conserve power, the printhead assembly 202 can be parked at the top or bottom of the screen 102, and the printhead 203 can print when moving in either direction. To prevent user access to the cavity in which the printhead assembly moves, the assembly is integrated into a screen-width belt which also acts as the carriage transport. The belt obscures the viewer's code sensor during printing, but contains pairs of matching holes which line up when the printhead is parked, providing the code sensor with a view of the surface. Two pairs of holes are provided, corresponding to the two parking positions.

Handwritten text can be transferred to the underlying page before or after it is recognized by the Netpage system and converted to computer text. If transferred after conversion, the viewer can transfer the computer text to the underlying page in place of the handwritten text. Similarly, a signature can be transferred to the page before or after it is used by the Netpage system to verify the identity of the user. If transferred after verification, the viewer can transfer a verification icon and/or a serial number in place of the signature.

The Netpage printing viewer can also be used to paste information onto a page, including images and text. The user may take a photo with a camera and paste it into an image field requiring the photo. The printing viewer links the photo to the image field and faithfully transfers the photo to the page, registered with the image field. If the viewer only partially overlaps the field, then only the portion of the field accessible to the viewer is printed with the photo. When the user moves the viewer across the field the viewer prints additional parts of the field. The viewer may prompt the user to move the viewer to cover un-printed portions of the field. Any un-printed portions of the image are recorded as pending output against the page instance maintained by the relevant Netpage page server. If a viewer comes into contact with the image field at a future time then any un-printed portions can be printed.

If the user pastes an image into a viewer-displayed image field when the viewer is not in contact with the page, then the entire image is recorded as pending output.

The printing viewer may incorporate a digital camera. Once the user takes a photo, it may "float" on the display as an icon until the user explicitly pastes it in an image field. The viewer may provide dedicated buttons for browsing, viewing, editing and deleting a collection of photos stored in the viewer. The viewer may also support removable storage, e.g. via a memory card socket, for storage of photos.

The user may also paste information which is known to the viewer or to the Netpage system, such as contact details, into a Netpage form which is not otherwise linked to the user.

The viewer may alternatively or additionally contain a mobile telephone transceiver for longer-range communication with a netpage server via a mobile telephone network. If the transceiver supports a third-generation 'always-on' packet-switched connection, then the viewer may download or stream page content at will. If the transceiver only supports a circuit-switched connection, then the viewer may choose to connect and download a full page description whenever it encounters a new page, provide local navigation of the page via the downloaded page description, and only make further connections when dynamic content needs to be displayed or when hyperlinks are activated.

If the viewer incorporates a longer-range transceiver, then it may act as a netpage base station for wireless netpage pens and other netpage sensing devices.

When used to interrogate secure data, the viewer may incorporate a fingerprint sensor, such as the Vericom FPS200, to allow it to continuously monitor and verify the identity of the user. The processor typically interrogates the fingerprint sensor via a serial interface.

The viewer may incorporate several levels of power management. After a period of inactivity the viewer may inactivate the display. After a longer period of inactivity the processor may enter a power-conserving quiescent state. Power management may be coupled with the image sensor and/or the touch sensor, allowing wake-up on screen interaction or movement. The viewer may also incorporate an accelerometer for this purpose.

The viewer may be configured with software allowing it to function as a personal digital assistant (PDA). The components and functions of the viewer may also be incorporated into a mobile phone.

The viewer handles a variety of page content, including styled text, outline graphics, bitmapped images, audio, and video. While audio and video are by their nature dynamic (i.e. time-varying), text, graphics and images are normally static. They may, however, be part of a dynamic stream representing the output of an interactive application, executing remotely or within the viewer. A local application may be defined by a script object which is interpreted by the viewer, e.g. coded in Java or similar.

Page content falls into three categories: (1) static elements which appear on the printed page; (2) static elements which only appear through the viewer; and (3) dynamic elements which only appear through the viewer. The first category includes all the visual elements of the page. The second category includes, for example, elements associated with controls for dynamic content, e.g. playback controls for a video clip, and elements associated with secure information. The third category includes anything of a dynamic nature, e.g. a video clip. A dynamic element may have a static counterpart in the page description so that it has a meaningful visual appearance on the printed page. A video clip, for example, may be represented by a rectangle of the appropriate size showing the title of the clip.

Figure 31:
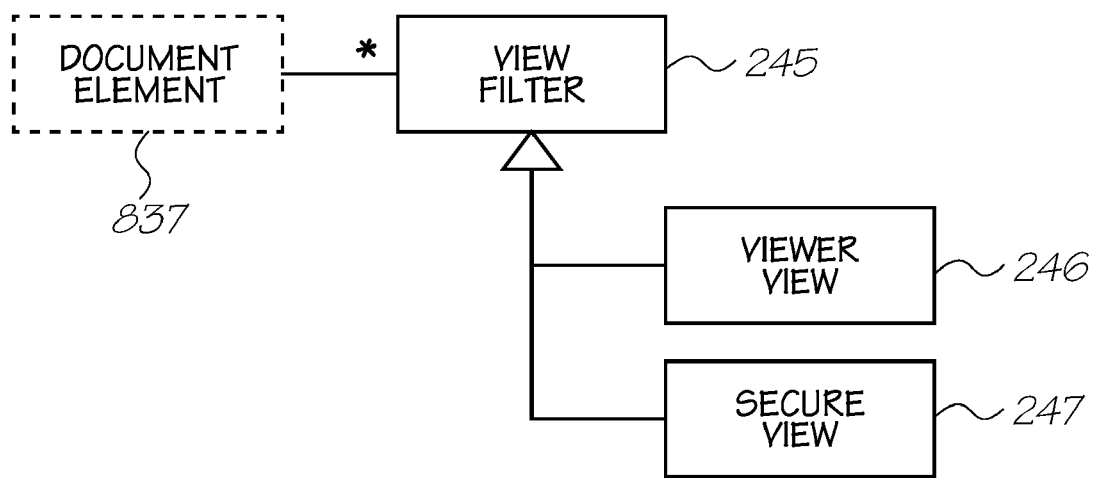
FIG. 31 shows a document element view.

Document elements in the second and third categories have associated view filters 245 which restrict their appearance. The 'viewer view' 246 filter restricts the element to appearing through a viewer. The 'secure view' 247 filter restricts the element to appearing through an authorized viewer. The view filter class diagram is shown in FIG. 31.

A digital ink stream is generated with a maximum data rate of about 5 Kbit/s. The viewer generates a view transform stream with a similar maximum data rate. The viewer therefore generates wireless communications traffic to the base station with a maximum data rate of about 10 Kbit/s, which is negligible.

To minimize wireless communications traffic from the base station to the viewer, it may be mandated that only one dynamic object can be active at a time. Even though more than one object may be visible through the viewer, the page server may deactivate all but one such object. It may, for example, only leave the dynamic object closest to the center of the viewer's display active. The user may be able to explicitly activate an alternative dynamic object by clicking on it with the stylus, or the user may be required to explicitly activate any dynamic object, thus implicitly deactivating any currently active object.

Where a dynamic object represents an application window, the page server typically relays to the application any changes to the viewer's view transform which relate to the application window. This allows the application to generate output when the window is visible, and to tailor the output to the actual overlap between the window and the viewer's view. The output from the application may be in the form of a video stream, or it may be in the form of a stream of graphics commands operating on text, graphics and images.

It is possible to display output from a remote application through the viewer, and capture stylus input through the viewer and route it to the remote application, without the application having to be explicitly designed for interaction with the viewer. Applications typically interact with user interface devices such as bitmapped displays, keyboards and pointing devices in a device-independent manner by utilizing the services of a windowing system, and this allows the user interface devices to be remote from the applications without changing how the applications interact with them.

As an alternative to rendering the view on demand, the viewer may render the entire page into a memory buffer and then simply display a suitably transformed window into the buffer. However, since the rotation of relatively low-resolution text produces unacceptable text quality, the page must either be rendered at a higher resolution than the display resolution and appropriately lowpass filtered before display, or the display resolution must be higher than assumed so far.

As a further alternative, the viewer may rely on the page server or the base station to render the page and supply it to the viewer, typically in compressed form. In this case the viewer is still responsible for integrating dynamic streams with the static page view.

As yet another alternative, the viewer may rely on the page server or the base station to render the current view and supply it to the viewer, typically in compressed form. In this case the viewer need contain no support whatsoever for interpreting and rendering the variety of elements which may comprise a page description. Assuming a 320×240 RGB pixel display, a 10 Hz update rate, and 10:1 compression, this requires a data rate of about 1.8 Mbit/s, which is within the realms of practicality using currently-available personal-area, local-area and wide-area wireless networking technologies as discussed above.

Figure 32:
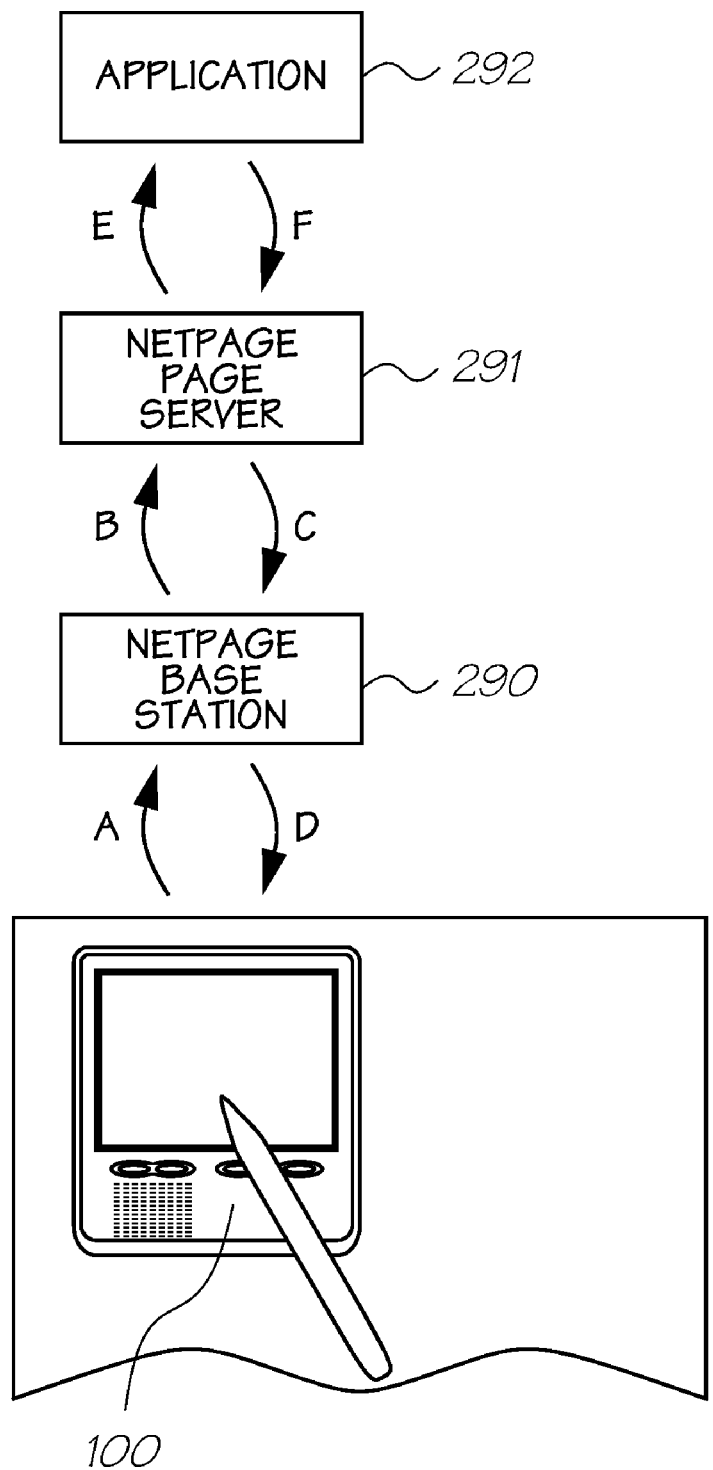
FIG. 32 shows the viewer interaction with a netpage network.

FIG. 32 illustrates the interaction between the netpage viewer 100 and the netpage network. The viewer's time-varying view transform, as well as digital ink captured via the viewer, are transmitted (at A) to a netpage base station 290. The base station 290 relays (at B) the view transform and digital ink to the page server 291 which holds the electronic description of the physical page with which the viewer is interacting as identified by the page ID embedded in the tags of the page. The page server 291 interprets the view transform and digital ink with respect to the page, and initially responds (at C) with the page description. It subsequently transmits (at C) dynamic object updates and streaming dynamic content. The base station relays (at D) data from the page server to the viewer.

The page server may notify (at E) an application 292 that the viewer's view onto a window associated with the application has changed, and the application 292 may respond (at F) with commands instructing the viewer 100 to update parts of its current view. The page server 291 relays (at C) these commands to the base station 290, which relays (at D) the commands on to the viewer 100.

Whilst the display of the preferred embodiment is visual, a Braille viewer may be made according to the invention. A Braille viewer is analogous to the optical viewer. It displays in registered fashion and via a tactile Braille display the text of a netpage. It also displays text labels corresponding to graphics and images, where available in the page description. Because Braille characters are typically rendered at larger sizes than visually-recognized characters, the Braille viewer typically presents a zoomed view of the underlying page. This means that as the viewer is moved over the page, the display moves correspondingly faster.

In other embodiments the viewer can be transparent when it is not in contact with a page, so that while it is being placed on a page, the page is seen through the viewer. This can be implemented using a LCD shutter which is reflective when opaque, positioned behind a transmissive color display. However, the netpage viewer design is simplified if the viewer is always opaque, and only ever virtually transparent.

Whilst the invention has been described with reference to the netpage system which uses invisible tags, the invention is not limited to the netpage system or the use of invisible tags. If desired, the invention may utilize tags or codes which are visible to the average unaided human eye, such as bar codes. The tags need not merely encode an identity which is then used to look up the relevant files. The tags may encode instructions at a higher level. For example a tag may encode an instruction of "play chapter 99". If invisible tags are used they need not be limited to the tags disclosed in relation to the netpage system. Other tagging systems are available and any suitable tagging system may be used. The invention is not limited to the use of inks which absorb certain wavelengths or fluoresce certain wavelengths. Magnetic inks, surface modification, including apertures, modification of the structure of the substrate itself all fall within the scope of the invention. The systems and methods to link the viewer of the present invention and the source of the document data are not limited to netpage systems. A viewer may be linked by a cable to a single computer, rather than a network of computers.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A handheld display device for overlaying a printed substrate and for associating a multimedia object with a zone of said printed substrate, said device comprising:

a memory storing one or more multimedia objects;

an optical sensor for imaging an area of the printed substrate and for generating image data;

a processor for determining interaction data using the image data, said interaction data identifying a page description corresponding to the printed substrate;

a transceiver for:

sending the interaction data to a computer system, thereby causing the computer system to identify the page description and retrieve display data corresponding to at least part of the printed substrate using the identified page description; and receiving the display data from the computer system; and an opaque touch-sensitive display screen for displaying display information based on said display data, said display information matching and aligning with printed content underlying said screen such that the opaque display screen has real-time virtual transparency through the screen to the printed content underlying said screen from a user's perspective to provide a virtual window to the printed content underlying said screen, wherein said device is configured such that a predetermined user interaction with the display information creates an association between one of said multimedia objects and the zone of the printed substrate, thereby causing the page description to be updated in accordance with said association, such that subsequent interaction with said zone of said printed substrate using said device causes retrieval of said multimedia object from said updated page description.

2. The device of claim 1, further comprising an input device for capturing said multimedia object.

3. The device of claim 1, wherein said multimedia object comprises a photo or video object and said handheld display device comprises a camera for capturing said photo or video object.

4. The device of claim 1, which is a mobile phone or a personal digital assistant.

5. The device of claim 4, wherein interaction data identifies a position of the device relative to the substrate and said retrieved display data corresponds to a part of the substrate containing said position.

6. The device of claim 1, wherein said transceiver is at least one of: a short-range wireless transceiver and a mobile phone transceiver.

7. The device of claim 1, wherein said device comprises a memory for storing the retrieved display data.

8. The device of claim 1 further comprising means for displaying zoomed-in information or zoomed-out information.

9. The device of claim 1 further comprising an accelerometer for detecting movement of the device.

10. The device of claim 1, further comprising means for snapping said display information, wherein snapped display information is displayed irrespective of a position of said device relative to said substrate.

11. The device of claim 10, wherein a snapped displayed hyperlink remains interactive via said touch-sensitive display screen irrespective of the position of said device relative to said substrate.

12. The device of claim 10 further comprising means for navigation of a display page via said snapped display information, said display page corresponding to the printed substrate.

13. The device of claim 12, wherein said means for navigation of said display page enables panning across said display page, said means for navigation of said display page comprising said touch-sensitive screen.

14. The device of claim 1 further comprising a printer for printing onto said substrate, said printer being configured to print an icon onto the zone said substrate, said icon representing said multimedia object associated with said zone.

15. The device of claim 1, wherein said printed substrate comprises coded data disposed thereon or therein, said coded data identifying a substrate identity indexed with said page description.

16. The device of claim 15, wherein said coded data further identifies a plurality of locations on the substrate.

* * * * *